(12) United States Patent
Lee et al.

(10) Patent No.: US 12,353,056 B2
(45) Date of Patent: Jul. 8, 2025

(54) OPTICAL IMAGING SYSTEM

(71) Applicant: SAMSUNG ELECTRO-MECHANICS CO., LTD., Suwon-si (KR)

(72) Inventors: Ji Su Lee, Suwon-si (KR); Dong Hyuk Jang, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 655 days.

(21) Appl. No.: 17/695,962

(22) Filed: Mar. 16, 2022

(65) Prior Publication Data

US 2023/0014291 A1 Jan. 19, 2023

(30) Foreign Application Priority Data

Jul. 12, 2021 (KR) .................. 10-2021-0091183
Dec. 10, 2021 (KR) .................. 10-2021-0176902

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
None
See application file for complete search history.

(56) References Cited

U.S. PATENT DOCUMENTS

| 8,541,738 B2 * | 9/2013 | Tona ............... H01J 37/244 250/307 |
| 8,599,495 B1 * | 12/2013 | Tsai ............... H04N 23/55 359/755 |
| 2014/0139719 A1 * | 5/2014 | Fukaya ............ G02B 27/0025 348/340 |

(Continued)

FOREIGN PATENT DOCUMENTS

| CN | 110346919 A | 10/2019 |
| CN | 110716287 A | 1/2020 |

(Continued)

OTHER PUBLICATIONS

Korean Office Action issued on May 8, 2024, in counterpart Korean Patent Application No. 10-2021-0176902 (5 pages in English, 4 pages in Korean).

(Continued)

*Primary Examiner* — Robert E. Tallman
(74) *Attorney, Agent, or Firm* — NSIP Law

(57) ABSTRACT

An optical imaging system is provided. The optical imaging system includes: a first lens, a second lens, a third lens, a fourth lens, a fifth lens, a sixth lens, and a seventh lens disposed in order from an object side to an imaging side. The first lens has positive refractive power, and the second lens has negative refractive power, and TTL/(2×IMG HT)<0.6 and −0.1<SAG42/TTL<0 are satisfied, where TTL is a distance from an object-side surface of the first lens to an imaging plane on an optical axis, IMG HT is equal to half a diagonal length of the imaging plane, and SAG42 is a SAG value at an end of an effective aperture of an image-side surface of the fourth lens.

19 Claims, 20 Drawing Sheets

(56) References Cited

U.S. PATENT DOCUMENTS

| | | | |
|---|---|---|---|
| 2015/0301310 A1* | 10/2015 | Chen | G02B 9/60 |
| | | | 348/373 |
| 2018/0188487 A1 | 7/2018 | Hsieh et al. | |
| 2019/0079270 A1 | 3/2019 | Tseng et al. | |
| 2019/0094494 A1 | 3/2019 | Hsu et al. | |
| 2019/0227277 A1* | 7/2019 | Tang | G02B 9/64 |
| 2019/0285863 A1 | 9/2019 | Yang | |
| 2019/0302424 A1 | 10/2019 | Kuo et al. | |
| 2019/0377161 A1* | 12/2019 | Lin | G02B 9/64 |
| 2020/0073085 A1* | 3/2020 | Huang | G02B 9/64 |
| 2020/0209546 A1* | 7/2020 | Zhao | G02B 9/64 |
| 2020/0225449 A1* | 7/2020 | Zirkel | G02B 13/0045 |
| 2021/0003829 A1 | 1/2021 | Dai et al. | |
| 2021/0048634 A1* | 2/2021 | Sun | G02B 13/0045 |
| 2021/0048638 A1 | 2/2021 | Chen et al. | |
| 2021/0055515 A1 | 2/2021 | Dai et al. | |
| 2021/0063695 A1 | 3/2021 | Hsieh et al. | |
| 2021/0063696 A1 | 3/2021 | Kamada et al. | |
| 2021/0132340 A1* | 5/2021 | Wang | G02B 9/64 |
| 2021/0356698 A1 | 11/2021 | Zhang et al. | |
| 2021/0382273 A1 | 12/2021 | Park et al. | |
| 2022/0283410 A1 | 9/2022 | Li et al. | |
| 2022/0291485 A1 | 9/2022 | Yang et al. | |
| 2022/0365317 A1 | 11/2022 | Chen et al. | |

FOREIGN PATENT DOCUMENTS

| | | |
|---|---|---|
| CN | 111413784 A | 7/2020 |
| CN | 112748554 A | 5/2021 |
| CN | 112965206 A | 6/2021 |
| CN | 113759502 A | 12/2021 |
| TW | 201728945 A | 8/2017 |
| TW | 201915518 A | 4/2019 |
| TW | 201915532 A | 4/2019 |

OTHER PUBLICATIONS

Taiwanese Office Action issued on May 22, 2023, in counterpart Taiwanese Patent Application No. 111109149 (4 pages in English, 5 pages in Chinese).
Taiwanese Office Action issued on Jul. 11, 2024, in counterpart Taiwanese Patent Application No. 113117834 (6 pages in English, 5 pages in Chinese).
Chinese Office Action Issued on Mar. 6, 2024, in Counterpart Chinese Patent Application No. 202210655918.4 (4 Pages in English, 7 Pages in Chinese).
Chines Office Action issued on Oct. 15, 2024, in counterpart Chinese Patent Application No. 202210655918.4 (6 pages in English, 8 pages in Chinese).

* cited by examiner

OPTICAL IMAGING SYSTEM

CROSS-REFERENCE TO RELATED APPLICATIONS

This application claims the benefit under 35 USC 119(a) of Korean Patent Application Nos. 10-2021-0091183 filed on Jul. 12, 2021, and 10-2021-0176902 filed on Dec. 10, 2021, in the Korean Intellectual Property Office, the entire disclosures of which are incorporated herein by reference for all purposes.

BACKGROUND

1. Field

The following description relates to an optical imaging system.

2. Description of Related Art

Portable terminals may include a camera including an optical imaging system with a plurality of lenses to perform operations, such as, but not limited to, video calls and image capturing.

As operations that are performed by the camera included in the portable terminals has gradually increased, there has been an increased demand for portable terminal that include high resolution cameras.

An image sensor having a high pixel count (for example, 13 million to 100 million pixels, or the like) may be employed in cameras implemented in portable terminals to achieve improved picture quality.

Additionally, since portable terminals may be implemented to have a small size, the camera disposed in portable terminals may also be implemented to have a reduced size, and thus, it may be desirable to develop an optical imaging system which achieves high resolution while having a reduced size.

The above information is presented as background information only, to assist in gaining an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, a fourth lens, a fifth lens, a sixth lens, and a seventh lens disposed in order from an object side to an imaging side, wherein: the first lens has positive refractive power, and the second lens has negative refractive power, wherein: $TTL/(2\times IMG\ HT)<0.6$ and $-0.1<SAG42/TTL<0$ are satisfied, where TTL is a distance from an object-side surface of the first lens to an imaging plane on an optical axis, IMG HT is equal to half a diagonal length of the imaging plane, and SAG42 is a SAG value at an end of an effective aperture of an image-side surface of the fourth lens.

At least one of $-0.2<SAG52/TTL<0$, $-0.2<SAG62/TTL<0$; and $-0.3<SAG72/TTL<0$ may be satisfied, where SAG52 is a SAG value at an end of an effective aperture of an image-side surface of the fifth lens, SAG62 is a SAG value at an end of an effective aperture of an image-side surface of the sixth lens, and SAG72 is a SAG value at an end of an effective aperture of an image-side surface of the seventh lens.

At least one of $25<v1-v2<45$, $25<v1-v4<45$, and $15<v1-v6<25$ may be satisfied, where v1 is an Abbe number of the first lens, v2 is an Abbe number of the second lens, v4 is an Abbe number of the fourth lens, and v6 is an Abbe number of the sixth lens.

$0<f1/f<1.4$ may be satisfied, where f is a total focal length of the optical imaging system, and f1 is a focal length of the first lens.

$-7<f2/f<-1$ may be satisfied, where f is a total focal length of the optical imaging system, and f2 is a focal length of the second lens.

$1<f3/f<6$ may be satisfied, where f is a total focal length of the optical imaging system, and f3 is a focal length of the third lens.

$-50<f4/f<0$ may be satisfied, where f is a total focal length of the optical imaging system, and f4 is a focal length of the fourth lens.

$0<|f5/f|/100<3$ may be satisfied, where f is a total focal length of the optical imaging system, and f5 is a focal length of the fourth lens.

$0<f6/f<5$ may be satisfied, where f is a total focal length of the optical imaging system, and f6 is a focal length of the sixth lens.

$-3<f7/f<0$ may be satisfied, where f is a total focal length of the optical imaging system, and f7 is a focal length of the seventh lens.

$TTL/f<1.3$ and $BFL/f<0.3$ may be satisfied, where f is a total focal length of the optical imaging system, and BFL is a distance from an image-side surface of the seventh lens to the imaging plane on the optical axis.

$D1/f<0.1$ may be satisfied, where D1 is a distance between an image-side surface of the first lens and an object-side surface of the second lens on the optical axis.

$FOV\times(IMG\ HT/f)>70°$ may be satisfied, where f is a total focal length of the optical imaging system, and FOV is a field of view of the optical imaging system.

$n2+n4+n5>4.8$ may be satisfied, where n2 is a refractive index of the second lens, n4 is a refractive index of the fourth lens, and n5 is a refractive index of the fifth lens.

The third lens may have positive refractive power, the fourth lens may have negative refractive power, the fifth lens may have negative refractive power, the sixth lens may have positive refractive power, and the seventh lens may have negative refractive power.

The third lens may have positive refractive power, the fourth lens may have negative refractive power, the fifth lens may have positive refractive power, the sixth lens may have positive refractive power, and the seventh lens may have negative refractive power.

In a general aspect, an optical imaging system includes a first lens, a second lens, a third lens, a fourth lens, a fifth lens, a sixth lens, and a seventh lens disposed in order from an object side to an imaging side, wherein at least one of $-0.1<SAG42/TTL<0$, $-0.2<SAG52/TTL<0$, $-0.2<SAG62/TTL<0$; and $-0.3<SAG72/TTL<0$ may be satisfied, where TTL is a distance from an object-side surface of the first lens to an imaging plane on an optical axis, SAG42 is a SAG value at an end of an effective aperture of an image-side surface of the fourth lens, SAG52 is a SAG value at an end of an effective aperture of an image-side surface of the fifth lens, SAG62 is a SAG value at an end of an effective aperture of an image-side surface of the sixth lens, and SAG72 is a SAG value at an end of an effective aperture of an image-side surface of the seventh lens.

At least one inflection point may be disposed on at least one of the first surface and the second surface of each of the fifth lens, the sixth lens, and the seventh lens.

BFL/f<0.3 may be satisfied, where f is a total focal length of the optical imaging system, and BFL is a distance from an image-side surface of the seventh lens to the imaging plane on the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
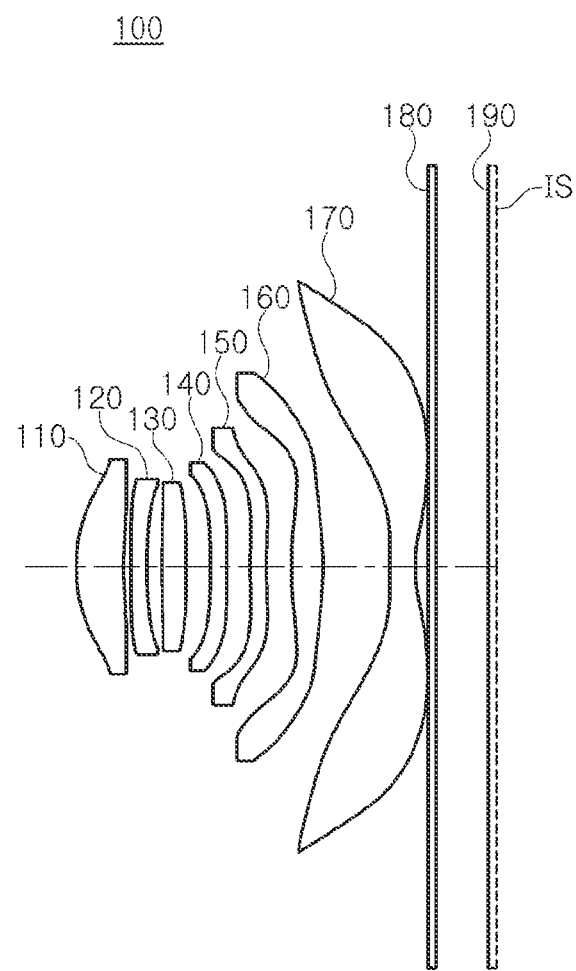
FIG. 1 is a diagram illustrating an example optical imaging system according to a first example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, one or more examples will be described as follows with respect to the accompanying drawings.

One or more examples provide an optical imaging system which may achieve high resolution and may have a reduced total length.

In the lens diagrams, a thickness, a size, and a shape of the lens are exaggerated, specifically, the shape of a spherical or aspherical surface presented in the lens diagram is merely an example and is not limited thereto.

A first lens refers to a lens most adjacent to an object side, and a seventh lens refers to a lens most adjacent to an imaging plane (or an image sensor).

A first surface of each lens refers to a surface adjacent to an object side (or an object-side surface), and a second surface of each lens refers to a surface adjacent to an image side (or an image-side surface). In the one or more examples, all numerical values of radii of curvature, thicknesses, distances, focal lengths, and the like, of lenses are indicated by millimeters (mm), and a field of view (FOV) is indicated by degrees.

In a description of a shape of each of the lenses, the disclosure that one surface of a lens is convex means that a paraxial region portion of a corresponding surface is convex, the disclosure that one surface of a lens is concave means that a paraxial region portion of a corresponding surface is concave, and the disclosure that one surface of a lens is a plane means that a paraxial region or portion of a corresponding surface is a plane. Therefore, although one surface of a lens may be described as being convex, an edge portion of the lens may be concave. Similarly, although one surface of a lens may be described as being concave, an edge portion of the lens may be convex. Additionally, although one surface of a lens may be described as being a plane, an edge portion of the lens may be convex or concave.

A paraxial region refers to a significantly narrow region adjacent to an optical axis.

The imaging plane may refer to a virtual plane on which a focus is formed by an optical imaging system. Alternatively, the imaging surface may refer to a surface of an image sensor on which light is received.

An optical imaging system in an example embodiment may include seven lenses.

In an example, the optical imaging system in an example embodiment may include a first lens, a second lens, a third lens, a fourth lens, a fifth lens, a sixth lens, and a seventh lens arranged in order from an object side to an imaging side. The first to seventh lenses may be spaced apart from each other by a predetermined distance along an optical axis.

However, the optical imaging system in an example embodiment is not limited to only including seven lenses, but may further include other components, as necessary.

In an example, the optical imaging system may further include an image sensor that converts an image of a subject incident thereon into an electrical signal.

Additionally, the optical imaging system may further include an infrared filter (hereinafter, referred to as a "filter") blocking infrared light. The filter may be disposed between the seventh lens and the image sensor.

Additionally, the optical imaging system may further include a stop that adjusts an amount of light.

The first to seventh lenses, included in the example optical imaging system, may be formed of a plastic material.

At least one of the first to seventh lenses may have an aspherical surface. Each of the first to seventh lenses may have at least one aspherical surface.

That is, at least one of the first and second surfaces of each of the first to seventh lenses may be an aspherical surface. The aspherical surface of each of the first to seventh lenses is represented, as follows in Equation 1 below:

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30}...$$

Equation 1

In Equation 1, c is a curvature of the lens (a reciprocal of the radius of curvature), K is a conic constant, and Y is a distance from one point on an aspherical surface of a lens to an optical axis. Additionally, constants A-H, J, and L-P are aspheric coefficients, and Z(SAG) is a distance from one point on the aspherical surface of the lens to a vertex of the aspherical surface in an optical axis direction.

The optical imaging system in an example embodiment may satisfy at least one of the conditional expressions, as follows:

| | |
|---|---|
| $0 < f1/f < 1.4$ | Conditional Expression 1: |
| $25 < v1-v2 < 45$ | Conditional Expression 2: |
| $25 < v1-v4 < 45$ | Conditional Expression 3: |
| $15 < v1-v6 < 25$ | Conditional Expression 4: |
| $-7 < f2/f < -1$ | Conditional Expression 5: |
| $1 < f3/f < 6$ | Conditional Expression 6: |
| $-50 < f4/f < 0$ | Conditional Expression 7: |

| | |
|---|---|
| $0 < \|f5/f\|/100 < 3$ | Conditional Expression 8: |
| $0 < f6/f < 5$ | Conditional Expression 9: |
| $-3 < f7/f < 0$ | Conditional Expression 10: |
| $TTL/f < 1.3$ | Conditional Expression 11: |
| $f1/f2 < 0$ | Conditional Expression 12: |
| $f1/f3 > 0$ | Conditional Expression 13: |
| $BFL/f < 0.3$ | Conditional Expression 14: |
| $D1/f < 0.1$ | Conditional Expression 15: |
| $TTL/(2 \times IMGHT) < 0.6$ | Conditional Expression 16: |
| $FOV \times (IMGHT/f) > 70°$ | Conditional Expression 17: |
| $n2 + n4 + n5 > 4.8$ | Conditional Expression 18: |
| $-0.1 < SAG42/TTL < 0$ | Conditional Expression 19: |
| $-0.2 < SAG52/TTL < 0$ | Conditional Expression 20: |
| $-0.2 < SAG62/TTL < 0$ | Conditional Expression 21: |
| $-0.3 < SAG72/TTL < 0$ | Conditional Expression 22: |

In the conditional expressions, f is a total focal length of the optical imaging system, f1 is a focal length of the first lens, f2 is a focal length of the second lens, f3 is a focal length of the third lens, f4 is a focal length of the fourth lens distance, f5 is a focal length of the fifth lens, f6 is a focal length of the sixth lens, and f7 is a focal length of the seventh lens.

In the conditional expressions, v1 is an Abbe number of the first lens, v2 is an Abbe number of the second lens, v4 is an Abbe number of the fourth lens, and v6 is an Abbe number of the sixth lens.

In the conditional expressions, TTL is a distance from the object-side surface of the first lens to an imaging plane on the optical axis, and BFL is a distance from the image-side surface of the seventh lens to the imaging plane on the optical axis.

In the conditional expression, D1 is a distance between the image-side surface of the first lens and the object-side surface of the second lens on the optical axis, IMG HT is equal to half a diagonal length of the imaging plane, and FOV is a field of view of the optical imaging system.

In the conditional expression, n2 is a refractive index of the second lens, n4 is a refractive index of the fourth lens, and n5 is a refractive index of the fifth lens.

In the conditional expressions, SAG42 is a SAG value at an end of an effective aperture of an object-side surface of the fourth lens, SAG52 is a SAG value at an end of an effective aperture of an object-side surface of the fifth lens, SAG62 is a SAG value at an end of an effective aperture of an object-side surface of the sixth lens, and SAG72 is a SAG value at an end of an effective aperture of an object-side surface of the seventh lens.

When a SAG value is negative, it means that an end of an effective aperture of a corresponding lens surface is disposed to be closer to an object side than to a vertex of the corresponding lens surface.

When a sagittal height (SAG) value is positive, it means that an end of an effective aperture of a corresponding lens surface is disposed to be closer to an image side than a vertex of the corresponding lens surface.

The first to seventh lenses, included in the optical imaging system in an example embodiment, will be described.

The first lens may have positive refractive power. Additionally, the first lens may have a meniscus shape of which an object-side surface is convex. Additionally, the first surface of the first lens may be convex, and the second surface of the first lens may be concave.

At least one of the first surface and the second surface of the first lens may be aspherical. In an example, both surfaces of the first lens may be aspherical.

The second lens may have negative refractive power. Additionally, the second lens may have a meniscus shape of which an object-side surface is convex. Additionally, the first surface of the second lens may be convex, and the second surface of the second lens may be concave.

At least one of the first surface and the second surface of the second lens may be aspherical. In an example, both surfaces of the second lens may be aspherical.

The third lens may have positive refractive power. Additionally, the third lens may have a shape of which both sides may be convex. Additionally, the first surface and the second surface of the third lens may be convex.

Alternatively, the third lens may have a meniscus shape of which an object-side surface is convex. Additionally, the first surface of the third lens may be convex, and the second surface of the third lens may be concave.

At least one of the first surface and the second surface of the third lens may be aspherical. In an example, both surfaces of the third lens may be aspherical.

The fourth lens may have negative refractive power. Additionally, both surfaces of the fourth lens may be concave. Additionally, the first surface and the second surface of the fourth lens may be concave.

Alternatively, the fourth lens may have a meniscus shape of which an image-side surface is convex. Additionally, the first surface of the fourth lens may be concave, and the second surface of the fourth lens may be convex.

At least one of the first surface and the second surface of the fourth lens may be aspherical. In an example, both surfaces of the fourth lens may be aspherical.

The fifth lens may have positive or negative refractive power. Additionally, the fifth lens may have a meniscus shape of which an object-side surface is convex. Additionally, the first surface of the fifth lens may be convex in a paraxial region, and the second surface of the fifth lens may be concave in the paraxial region.

At least one of the first surface and the second surface of the fifth lens may be aspherical. In an example, both surfaces of the fifth lens may be aspherical.

At least one inflection point may be formed on at least one of the first surface and the second surface of the fifth lens. In an example, the first surface of the fifth lens may be convex in the paraxial region and concave in a portion or region other than the paraxial region. The second surface of the fifth lens may be concave in the paraxial region and convex in a portion or region other than the paraxial region.

The sixth lens may have positive refractive power. Additionally, the sixth lens may have a shape of which both surfaces are convex. Additionally, the first surface of the sixth lens may be convex in the paraxial region, and the second surface of the sixth lens may be convex in the paraxial region.

At least one of the first surface of the sixth lens and the second surface of the sixth lens may be aspherical. In an example, both surfaces of the sixth lens may be aspherical.

At least one inflection point may be formed on at least one of the first surface and the second surface of the sixth lens.

In an example, the first surface of the sixth lens may be convex in the paraxial region and concave in a portion or region other than the paraxial region. The second surface of the sixth lens may be convex in the paraxial region and concave in a portion or region other than the paraxial region.

The seventh lens may have negative refractive power. Additionally, the seventh lens may have a meniscus shape of which an object-side surface is convex. Additionally, the first surface of the seventh lens may be convex in the paraxial region, and the second surface of the seventh lens may be concave in the paraxial region.

At least one of the first surface and the second surface of the seventh lens may be aspherical. In an example, both surfaces of the seventh lens may be aspherical.

At least one inflection point may be formed on at least one of the first surface and the second surface of the seventh lens. In an example, the first surface of the seventh lens may be convex in the paraxial region and concave in a portion or region other than the paraxial region. The second surface of the seventh lens may be concave in the paraxial region and convex in a portion or region other than the paraxial region.

Each of the first to seventh lenses may be formed of a plastic material having optical properties different from optical properties of an adjacent lens.

Among the first to seventh lenses, at least three lenses may have a refractive index greater than 1.61. In an example, the refractive index of each of the second lens, the fourth lens, and the fifth lens may be greater than 1.61.

Among the first to fourth lenses, a lens having a negative refractive index may have a refractive index greater than 1.67. In an example, the second lens and the fourth lens may have negative refractive power and may have a refractive index greater than 1.67.

A sum of an Abbe number of the second lens and an Abbe number of the fourth lens may be smaller than an Abbe number of the third lens.

An example optical imaging system according to a first example embodiment will be described with reference to FIGS. 1 and 2.

An example optical imaging system 100 in the first example embodiment may include an optical system including a first lens 110, a second lens 120, a third lens 130, a fourth lens 140, a fifth lens 150, a sixth lens 160, and a seventh lens 170, and may further include a filter 180 and an image sensor IS.

The example optical imaging system in the first example embodiment may focus an image on an imaging plane 190. The imaging plane 190 may refer to a surface on which a focus or an image is formed by an optical imaging system. In an example, the imaging plane 190 may refer to one surface of the image sensor IS on which light is received.

The lens properties (a radius of curvature, a thickness of the lens or a distance between the lenses, a refractive index, an Abbe number, and a focal length) of each lens are listed in Table 1 below.

TABLE 1

| Surface No. | Note | Radius of Curvature | Thickness or Distance | Refractive Index | Abbe Number | Focal Length |
|---|---|---|---|---|---|---|
| S1 | First Lens | 2.0048 | 0.6305 | 1.544 | 56.0 | 4.72 |
| S2 | | 8.0202 | 0.1000 | | | |
| S3 | Second Lens | 12.4438 | 0.2200 | 1.671 | 19.2 | -12.5 |
| S4 | | 5.0127 | 0.1928 | | | |

TABLE 1-continued

| Surface No. | Note | Radius of Curvature | Thickness or Distance | Refractive Index | Abbe Number | Focal Length |
|---|---|---|---|---|---|---|
| S5 | Third Lens | 16.3086 | 0.3279 | 1.535 | 55.7 | 13.9 |
| S6 | | -13.6800 | 0.3164 | | | |
| S7 | Fourth Lens | -18.0868 | 0.2200 | 1.671 | 19.2 | -22.04 |
| S8 | | 87.0685 | 0.3131 | | | |
| S9 | Fifth Lens | 5.7611 | 0.2209 | 1.635 | 24.0 | -19.36 |
| S10 | | 3.8759 | 0.3312 | | | |
| S11 | Sixth Lens | 6.3018 | 0.4119 | 1.567 | 37.4 | 4.22 |
| S12 | | -3.8050 | 0.8874 | | | |
| S13 | Seventh Lens | 46.6439 | 0.3563 | 1.544 | 56.0 | -3.62 |
| S14 | | 1.8903 | 0.1615 | | | |
| S15 | Filter | Infinity | 0.1100 | 1.517 | 64.2 | |
| S16 | | Infinity | 0.7000 | | | |
| S17 | Imaging Plane | Infinity | | | | |

In the example optical imaging system in the first example embodiment, a total focal length f may be 4.7 mm, IMG HT may be 5.107 mm, FOV may be 92.2°, SAG42 may be -0.285 mm, SAG52 may be -0.4607 mm, SAG62 may be -0.9198 mm, and SAG72 may be -1.5098 mm.

In the first example embodiment, the first lens 110 may have positive refractive power, the first surface of the first lens 110 may be convex, and the second surface of the first lens 110 may be concave.

The second lens 120 may have negative refractive power, the first surface of the second lens 120 may be convex, and the second surface of the second lens 120 may be concave.

The third lens 130 may have positive refractive power, and the first surface of the third lens 130 may be convex, and the second surface of the third lens 130 may be convex.

The fourth lens 140 may have negative refractive power, and the first surface of the fourth lens 140 may be concave, and second surface of the fourth lens 140 may be concave.

The fifth lens 150 may have negative refractive power, the first surface of the fifth lens 150 may be convex in a paraxial region, and the second surface of the fifth lens 150 may be concave in the paraxial region.

At least one inflection point may be formed on at least one of the first surface and the second surface of the fifth lens 150. In an example, the first surface of the fifth lens 150 may be convex in the paraxial region and concave in a portion or region other than the paraxial region. The second surface of the fifth lens 150 may be concave in the paraxial region and convex in a portion or region other than the paraxial region.

The sixth lens 160 may have positive refractive power, and the first surface of the sixth lens 160 may be convex in the paraxial region, and the second surface of the sixth lens 160 may be convex in the paraxial region.

At least one inflection point may be formed on at least one of the first surface and the second surface of the sixth lens 160. In an example, the first surface of the sixth lens 160 may be convex in the paraxial region and concave in a portion or region other than the paraxial region. The second surface of the sixth lens 160 may be convex in the paraxial region and concave in a portion or region other than the paraxial region.

The seventh lens 170 may have negative refractive power, the first surface of the seventh lens 170 may be convex in the paraxial region, and the second surface of the seventh lens 170 may be concave in the paraxial region.

At least one inflection point may be formed on at least one of the first surface and the second surface of the seventh lens 170. In an example, the first surface of the seventh lens 170 may be convex in the paraxial region and concave in a portion or region other than the paraxial region. The second surface of the seventh lens 170 may be concave in the paraxial region and convex in a portion or region other than the paraxial region.

TABLE 2

| | Surface No. | | | | | | |
|---|---|---|---|---|---|---|---|
| | S1 | S2 | S3 | S4 | S5 | S6 | S7 |
| Conic Coefficient (K) | −2.196 | −41.852 | 48.837 | 13.910 | 0.000 | 0.000 | 0.000 |
| 4th Coefficient(A) | 2.167E−02 | −3.899E−02 | −5.759E−02 | 6.427E−03 | 5.092E−02 | −3.453E−02 | −4.132E−02 |
| 6th Coefficient(B) | 8.841E−02 | 3.326E−01 | 6.035E−01 | −5.573E−01 | −1.384E+00 | 1.254E−01 | −5.924E−01 |
| 8th Coefficient(C) | −6.124E−01 | −2.736E+00 | −6.206E+00 | 7.223E+00 | 1.557E+01 | −1.185E+00 | 5.935E+00 |
| 10th Coefficient(D) | 2.489E+00 | 1.435E+01 | 4.184E+01 | −5.585E+01 | −1.109E+02 | 6.197E+00 | 3.771E+01 |
| 12th Coefficient(E) | −6.628E+00 | −5.028E+01 | −1.866E+02 | 2.851E+02 | 5.287E+02 | −2.084E+01 | 1.604E+02 |
| 14th Coefficient(F) | 1.210E+01 | 1.223E+02 | 5.728E+02 | −1.003E+03 | −1.752E+03 | 4.736E+01 | −4.767E+02 |
| 16th Coefficient(G) | −1.559E+01 | −2.113E+02 | −1.242E+03 | 2.490E+03 | 4.137E+03 | −7.441E+01 | 1.013E+03 |
| 18th Coefficient(H) | 1.439E+01 | 2.627E+02 | 1.930E+03 | −4.420E+03 | −7.040E+03 | 8.116E+01 | −1.558E+03 |
| 20th Coefficient(J) | −9.539E+00 | −2.353E+02 | −2.154E+03 | 5.626E+03 | 8.649E+03 | −6.044E+01 | 1.733E+03 |
| 22nd Coefficient(L) | 4.486E+00 | 1.504E+02 | 1.710E+03 | −5.082E+03 | −7.592E+03 | 2.934E+01 | −1.380E+03 |
| 24th Coefficient(M) | −1.455E+00 | −6.684E+01 | −9.422E+02 | 3.177E+03 | 4.637E+03 | −8.375E+00 | 7.664E+02 |
| 26th Coefficient(N) | 3.082E−01 | 1.961E+01 | 3.420E+02 | −1.306E+03 | −1.870E+03 | 1.065E+00 | −2.819E+02 |
| 28th Coefficient(O) | −3.813E−02 | −3.415E+00 | −7.352E+01 | 3.170E+02 | 4.474E+02 | 0.000E+00 | 6.170E+01 |
| 30th Coefficient(P) | 2.072E−03 | 2.671E−01 | 7.087E+00 | −3.441E+01 | −4.801E+01 | 0.000E+00 | −6.083E+00 |

| | Surface No. | | | | | | |
|---|---|---|---|---|---|---|---|
| | S8 | S9 | S10 | S11 | S12 | S13 | S14 |
| Conic Coefficient (K) | 0.000 | −30.032 | 0.000 | 5.252 | −6.524 | 0.000 | −4.918 |
| 4th Coefficient(A) | −8.291E−02 | −1.735E−01 | −2.075E−01 | 4.439E−02 | 8.306E−02 | −1.832E−01 | −1.381E−01 |
| 6th Coefficient(B) | 8.668E−02 | −5.697E−02 | −1.968E−01 | −1.915E−01 | −3.832E−02 | 9.515E−02 | 9.423E−02 |
| 8th Coefficient(C) | −3.515E−01 | 6.298E−01 | 1.227E+00 | 3.572E−01 | −3.033E−02 | −4.346E−02 | −5.378E−02 |
| 10th Coefficient(D) | 1.138E+00 | −1.375E+00 | −3.239E+00 | −5.374E−01 | 8.860E−02 | 1.947E−02 | 2.487E−02 |
| 12th Coefficient(E) | −2.816E+00 | 1.780E+00 | 5.808E+00 | 6.065E−01 | −9.913E−02 | −6.804E−03 | −8.958E−03 |
| 14th Coefficient(F) | 4.995E+00 | −1.670E+00 | −7.516E+00 | −5.036E−01 | 6.618E−02 | 1.675E−03 | 2.448E−03 |
| 16th Coefficient(G) | −6.473E+00 | 1.265E+00 | 7.076E+00 | 3.034E−01 | −2.946E−02 | −2.878E−04 | −5.015E−04 |
| 18th Coefficient(H) | 6.395E+00 | −7.976E−01 | −4.835E+00 | −1.320E−01 | 9.183E−03 | 3.474E−05 | 7.632E−05 |
| 20th Coefficient(J) | −4.986E+00 | 3.888E−01 | 2.378E+00 | 4.120E−02 | −2.042E−03 | −2.947E−06 | −8.541E−06 |
| 22nd Coefficient(L) | 3.071E+00 | −1.293E−01 | −8.289E−01 | −9.100E−03 | 3.237E−04 | 1.730E−07 | 6.906E−07 |
| 24th Coefficient(M) | −1.429E+00 | 2.519E−02 | 1.990E−01 | 1.384E−03 | −3.582E−05 | −6.768E−09 | −3.915E−08 |
| 26th Coefficient(N) | 4.619E−01 | −2.135E−03 | −3.122E−02 | −1.374E−04 | 2.635E−06 | 1.629E−10 | 1.473E−09 |
| 28th Coefficient(O) | −9.076E−02 | 0.000E+00 | 2.877E−03 | 8.017E−06 | −1.161E−07 | −2.024E−12 | −3.297E−11 |
| 30th Coefficient(P) | 8.075E−03 | 0.000E+00 | −1.180E−04 | −2.082E−07 | 2.325E−09 | 7.567E−15 | 3.321E−13 |

Figure 2:
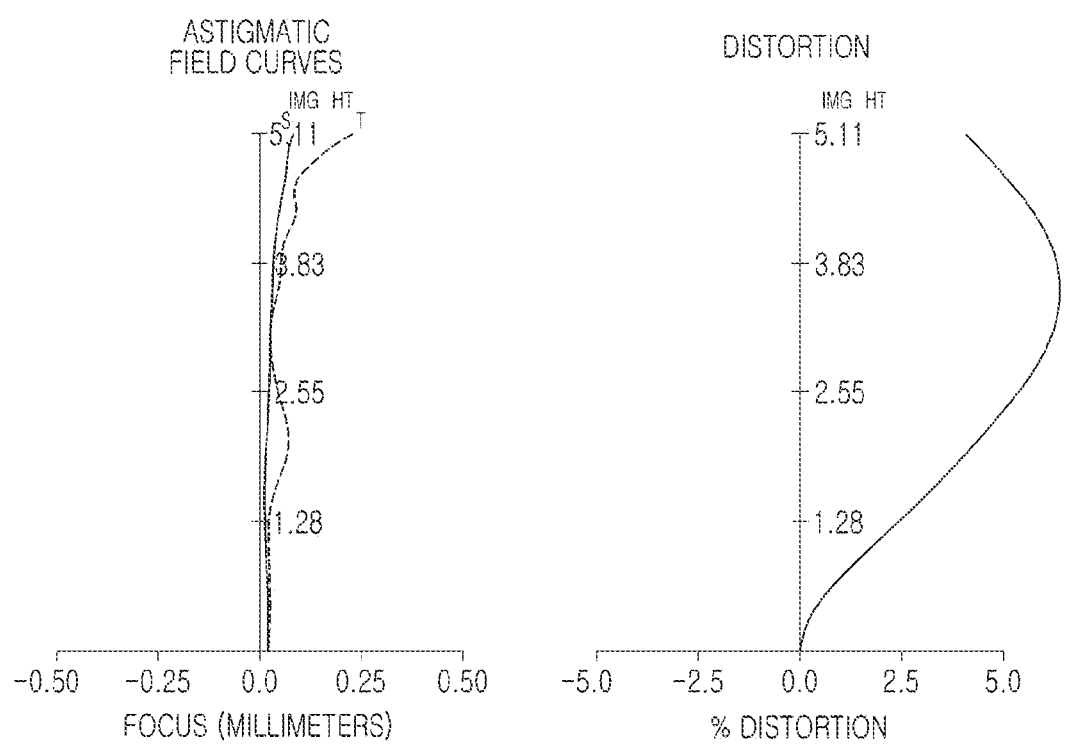
FIG. 2 is a diagram illustrating aberration properties of the example optical imaging system illustrated in FIG. 1.

The above-configured optical imaging system may have aberration properties illustrated in FIG. 2.

Figure 3:
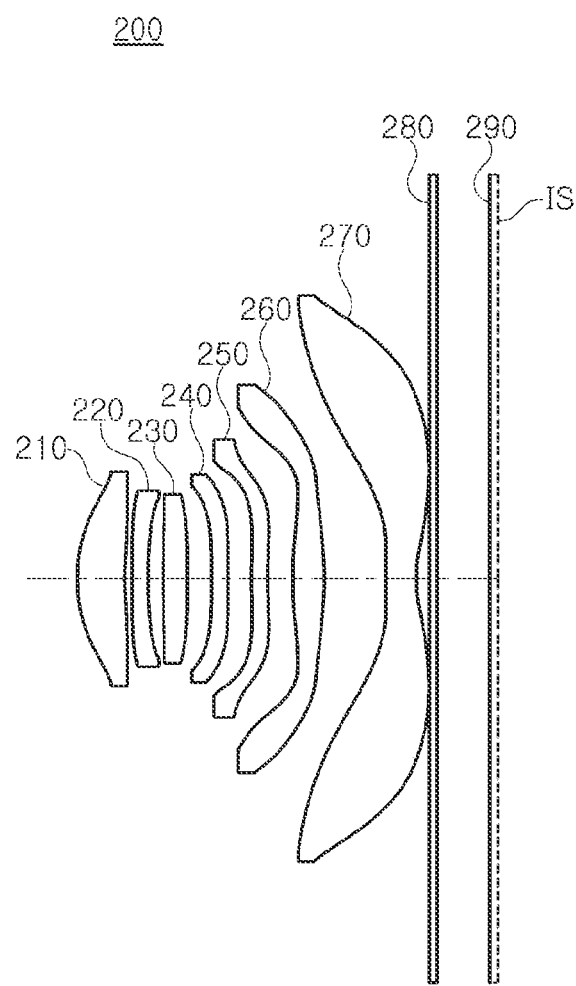
FIG. 3 is a diagram illustrating an example optical imaging system according to a second example embodiment.

An example optical imaging system according to a second example embodiment will be described with reference to FIGS. 3 and 4.

An example optical imaging system 200 in the second example embodiment may include an optical system including a first lens 210, a second lens 220, a third lens 230, a fourth lens 240, a fifth lens 250, a sixth lens 260, and a seventh lens 270, and may further include a filter 280 and an image sensor IS.

The example optical imaging system 200 in the second example embodiment may focus an image on an imaging plane 290. The imaging plane 290 may refer to a surface on which a focus is formed by an optical imaging system. In an example, the imaging plane 290 may refer to one surface of the image sensor IS on which light is received.

The lens properties (a radius of curvature, a thickness of the lens or a distance between the lenses, a refractive index, an Abbe number, and a focal length) of each lens are listed in Table 3 below.

TABLE 3

| Surface No. | Note | Radius of Curvature | Thickness or Distance | Refractive Index | Abbe Number | Focal Length |
|---|---|---|---|---|---|---|
| S1 | First Lens | 2.0035 | 0.6245 | 1.544 | 56.0 | 4.73 |
| S2 |  | 7.9396 | 0.1000 |  |  |  |
| S3 | Second Lens | 12.3844 | 0.2200 | 1.671 | 19.2 | −12.57 |
| S4 |  | 5.0156 | 0.1897 |  |  |  |
| S5 | Third Lens | 15.9371 | 0.3317 | 1.535 | 55.7 | 13.36 |
| S6 |  | −12.9628 | 0.3198 |  |  |  |
| S7 | Fourth Lens | −16.5044 | 0.2200 | 1.671 | 19.2 | −21.5 |
| S8 |  | 127.0180 | 0.3096 |  |  |  |
| S9 | Fifth Lens | 5.8944 | 0.2200 | 1.635 | 24.0 | −18.5 |
| S10 |  | 3.8803 | 0.3280 |  |  |  |
| S11 | Sixth Lens | 6.2741 | 0.4233 | 1.567 | 37.4 | 4.09 |
| S12 |  | −3.6294 | 0.8348 |  |  |  |
| S13 | Seventh Lens | 46.3653 | 0.4000 | 1.544 | 56.0 | −3.45 |
| S14 |  | 1.8050 | 0.1685 |  |  |  |
| S15 | Filter | Infinity | 0.1100 | 1.517 | 64.2 |  |
| S16 |  | Infinity | 0.7000 |  |  |  |
| S17 | Imaging Plane | Infinity |  |  |  |  |

In the example optical imaging system in the second example embodiment, a total focal length f may be 4.69 mm, IMG HT may be 5.107 mm, FOV may be 92.3°, SAG42 may be −0.2884 mm, SAG52 may be −0.4644 mm, SAG62 may be −0.9078 mm, and SAG72 may be −1.374 mm.

In the second example embodiment, the first lens 210 may have positive refractive power, the first surface of the first lens 210 may be convex, and the second surface of the first lens 210 may be concave.

The second lens 220 may have negative refractive power, the first surface of the second lens 220 may be convex, and the second surface of the second lens 220 may be concave.

The third lens 230 may have positive refractive power, and the first surface of the third lens 230 may be convex, and second surface of the third lens 230 may be convex.

The fourth lens 240 may have negative refractive power, and the first surface of the fourth lens 240 may be concave, and the second surface of the fourth lens 240 may be concave.

The fifth lens 250 may have negative refractive power, the first surface of the fifth lens 250 may be convex in the paraxial region, and the second surface of the fifth lens 250 may be concave in a paraxial region.

At least one inflection point may be formed on at least one of the first surface and the second surface of the fifth lens 250. In an example, the first surface of the fifth lens 250 may be convex in the paraxial region and concave in a portion or region other than the paraxial region. The second surface of the fifth lens 250 may be concave in the paraxial region and convex in a portion or region other than the paraxial region.

The sixth lens 260 may have positive refractive power, and the first surface of the sixth lens 260 may be convex in the paraxial region, and the second surface of the sixth lens 260 may be convex in the paraxial region.

At least one inflection point may be formed on at least one of the first surface and the second surface of the sixth lens 260. In an example, the first surface of the sixth lens 260 may be convex in the paraxial region and concave in a portion or region other than the paraxial region. The second surface of the sixth lens 260 may be convex in the paraxial region and concave in a portion or region other than the paraxial region.

The seventh lens 270 may have negative refractive power, the first surface of the seventh lens 270 may be convex in the paraxial region, and the second surface of the seventh lens 270 may be concave in the paraxial region.

At least one inflection point may be formed on at least one of the first surface and the second surface of the seventh lens 270. In an example, the first surface of the seventh lens 270 may be convex in the paraxial region and concave in a portion or region other than the paraxial region. The second surface of the seventh lens 270 may be concave in the paraxial region and convex in a portion or region other than the paraxial region.

Each surface of the first lens 210 to the seventh lens 270 may have an aspherical coefficient, as illustrated in Table 4 below. In an example, both the object-side surfaces and the image-side surfaces of the first lens 210 to the seventh lens 270 may be aspherical.

TABLE 4

|  | Surface No. | | | | | | |
|---|---|---|---|---|---|---|---|
|  | S1 | S2 | S3 | S4 | S5 | S6 | S7 |
| Conic Coefficient (K) | −2.240 | −42.284 | 48.970 | 13.917 | 0.000 | 0.000 | 0.000 |
| 4th Coefficient(A) | 2.000E−02 | −3.950E−02 | −5.590E−02 | 4.921E−03 | 4.373E−02 | −3.431E−02 | −3.339E−02 |
| 6th Coefficient(B) | 8.515E−02 | 3.502E−01 | 5.559E−01 | −5.020E−01 | 1.209E+00 | 1.192E−01 | −7.503E−01 |

TABLE 4-continued

| | | | | | | | |
|---|---|---|---|---|---|---|---|
| 8th Coefficient(C) | 4.580E−01 | 2.933E+00 | 5.608E+00 | 6.363E+00 | 1.332E+01 | 1.101E+00 | 7.422E+00 |
| 10th Coefficient(D) | 1.402E+00 | 1.572E+01 | 3.756E+01 | 4.838E+01 | 9.342E+01 | 5.542E+00 | 4.621E+01 |
| 12th Coefficient(E) | 2.529E+00 | 5.655E+01 | 1.670E+02 | 2.443E+02 | 4.391E+02 | 1.780E+01 | 1.926E+02 |
| 14th Coefficient(F) | 2.242E+00 | 1.416E+02 | 5.118E+02 | 8.517E+02 | 1.436E+03 | 3.847E+01 | 5.616E+02 |
| 16th Coefficient(G) | 5.602E−01 | 2.526E+02 | 1.109E+03 | 2.099E+03 | 3.346E+03 | 5.728E+01 | 1.174E+03 |
| 18th Coefficient(H) | 4.221E+00 | 3.246E+02 | 1.723E+03 | 3.701E+03 | 5.619E+03 | 5.916E+01 | 1.777E+03 |
| 20th Coefficient(J) | 5.729E+00 | 3.009E+02 | 1.923E+03 | 4.677E+03 | 6.806E+03 | 4.177E+01 | 1.951E+03 |
| 22nd Coefficient(L) | 4.385E+00 | 1.992E+02 | 1.527E+03 | 4.194E+03 | 5.885E+03 | 1.929E+01 | 1.535E+03 |
| 24th Coefficient(M) | 2.114E+00 | 9.177E+01 | 8.411E+02 | 2.602E+03 | 3.537E+03 | 5.266E+00 | 8.441E+02 |
| 26th Coefficient(N) | 6.383E−01 | 2.793E+01 | 3.054E+02 | 1.061E+03 | 1.401E+03 | 6.444E−01 | 3.076E+02 |
| 28th Coefficient(O) | 1.107E−01 | 5.047E+00 | 6.567E+01 | 2.552E+02 | 3.287E+02 | 0.000E+00 | 6.677E+01 |
| 30th Coefficient(P) | 8.434E−03 | 4.098E−01 | 6.333E+00 | 2.744E+01 | 3.451E+01 | 0.000E+00 | 6.533E+00 |

| | Surface No. | | | | | | |
|---|---|---|---|---|---|---|---|
| | S8 | S9 | S10 | S11 | S12 | S13 | S14 |
| Conic Coefficient (K) | 0.000 | −30.646 | 0.000 | 5.284 | −6.548 | 0.000 | 0.000 |
| 4th Coefficient(A) | 8.198E−02 | −1.689E−01 | −2.130E−01 | 4.550E−02 | 8.559E−02 | −1.912E−01 | −1.416E−01 |
| 6th Coefficient(B) | 6.763E−02 | −1.210E−01 | −1.861E−01 | −1.916E−01 | −5.162E−02 | 1.034E−01 | 9.932E−02 |
| 8th Coefficient(C) | 1.952E−01 | 9.331E−01 | 1.214E+00 | 3.547E−01 | −2.929E−03 | −4.934E−02 | −5.611E−02 |
| 10th Coefficient(D) | 3.983E−01 | 2.211E+00 | 3.253E+00 | −5.326E−01 | 5.305E−02 | 2.278E−02 | 2.468E−02 |
| 12th Coefficient(E) | 4.968E−01 | 3.306E+00 | 5.909E+00 | 6.024E−01 | −6.718E−02 | −8.180E−03 | −8.248E−03 |
| 14th Coefficient(F) | 1.470E−01 | 3.597E+00 | 7.740E+00 | −5.016E−01 | 4.578E−02 | 2.080E−03 | 2.072E−03 |
| 16th Coefficient(G) | 1.787E+00 | 2.976E+00 | 7.366E+00 | 3.029E−01 | −2.011E−02 | −3.716E−04 | −3.899E−04 |
| 18th Coefficient(H) | 3.281E+00 | 1.862E+00 | 5.081E+00 | −1.319E−01 | 6.084E−03 | 4.707E−05 | 5.476E−05 |
| 20th Coefficient(J) | 3.244E+00 | 8.420E−01 | 2.520E+00 | 4.116E−02 | −1.302E−03 | −4.232E−06 | −5.688E−06 |
| 22nd Coefficient(L) | 1.940E+00 | −2.550E−01 | −8.846E−01 | −9.085E−03 | 1.976E−04 | 2.672E−07 | 4.295E−07 |
| 24th Coefficient(M) | 6.926E−01 | 4.558E−02 | 2.137E−01 | 1.380E−03 | −2.092E−05 | −1.149E−08 | −2.285E−08 |
| 26th Coefficient(N) | 1.298E−01 | −3.602E−03 | −3.373E−02 | −1.369E−04 | 1.478E−06 | 3.166E−10 | 8.104E−10 |
| 28th Coefficient(O) | 6.723E−03 | 0.000E+00 | 3.126E−03 | 7.981E−06 | −6.300E−08 | −4.931E−12 | −1.716E−11 |
| 30th Coefficient(P) | 9.094E−04 | 0.000E+00 | −1.289E−04 | −2.071E−07 | 1.235E09− | 3.163E−14 | 1.640E−13 |

Figure 4:
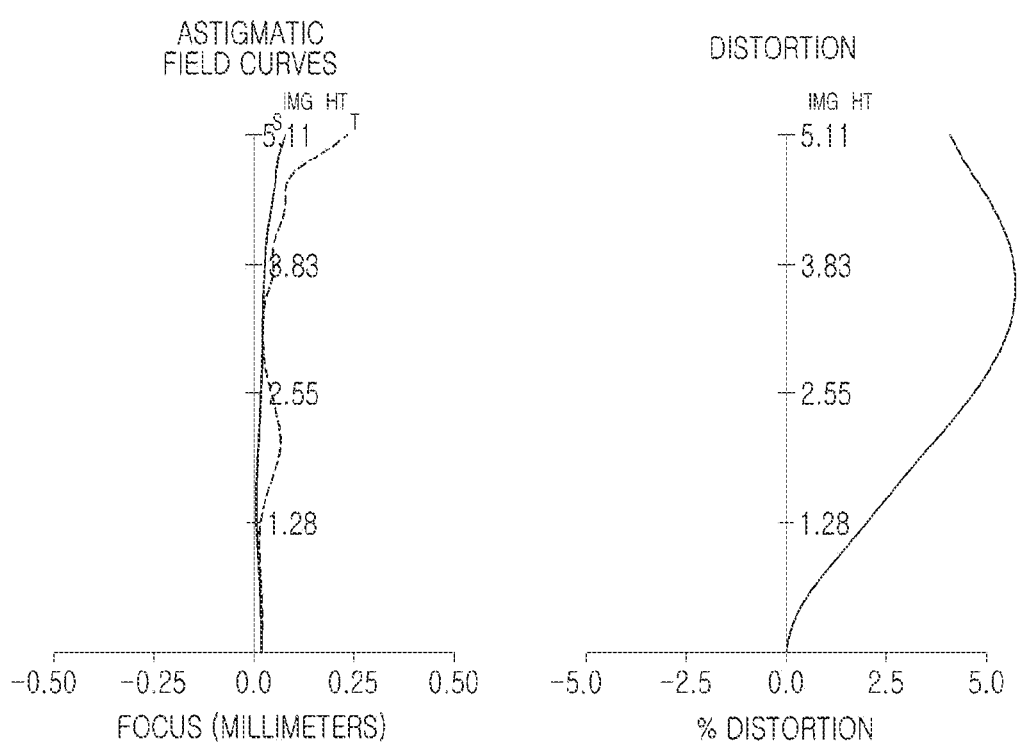
FIG. 4 is a diagram illustrating aberration properties of the example optical imaging system illustrated in FIG. 3.

The above-configured optical imaging system may have aberration properties illustrated in FIG. 4.

Figure 5:
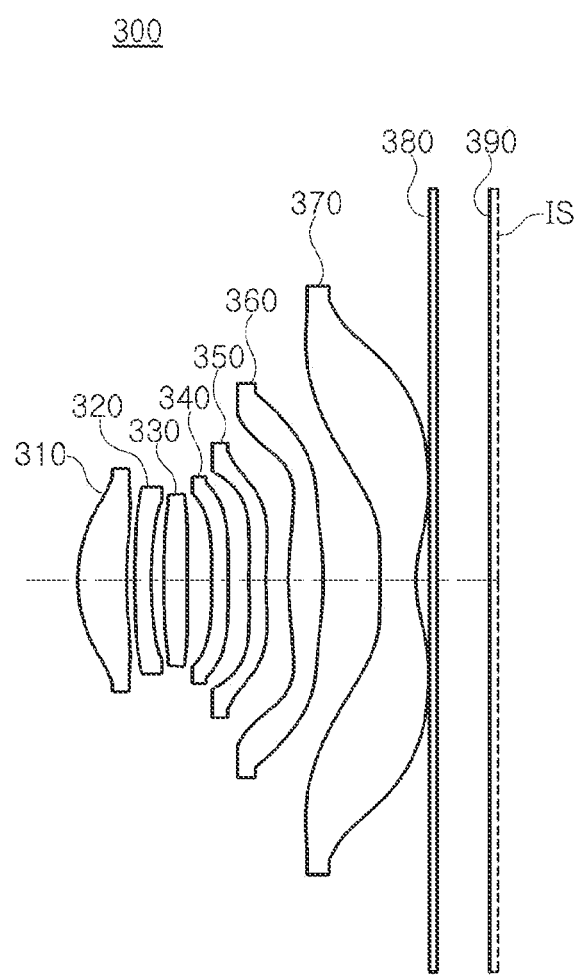
FIG. 5 is a diagram illustrating an example optical imaging system according to a third example embodiment.

An example optical imaging system according to a third example embodiment will be described with reference to FIGS. 5 and 6.

An example optical imaging system 300 in the third example embodiment may include an optical system including a first lens 310, a second lens 320, a third lens 330, a fourth lens 340, a fifth lens 350, a sixth lens 360, and a seventh lens 370, and may further include a filter 380 and an image sensor IS.

The example optical imaging system in the third example embodiment may form a focus on an imaging plane 390. The imaging plane 390 may refer to a surface on which a focus is formed by an optical imaging system. In an example, the imaging plane 390 may refer to one surface of the image sensor IS on which light is received.

The lens properties (a radius of curvature, a thickness of the lens or a distance between the lenses, a refractive index, an Abbe number, and a focal length) of each lens are listed in Table 5 below.

TABLE 5

| Surface No. | Note | Radius of Curvature | Thickness or Distance | Refractive Index | Abbe Number | Focal Length |
|---|---|---|---|---|---|---|
| S1 | First Lens | 1.9556 | 0.6505 | 1.544 | 56.0 | 4.79 |
| S2 | | 6.8350 | 0.1115 | | | |

TABLE 5-continued

| Surface No. | Note | Radius of Curvature | Thickness or Distance | Refractive Index | Abbe Number | Focal Length |
|---|---|---|---|---|---|---|
| S3 | Second Lens | 11.3015 | 0.2200 | 1.671 | 19.2 | −13.95 |
| S4 | | 5.1122 | 0.1685 | | | |
| S5 | Third Lens | 8.5613 | 0.3160 | 1.535 | 55.7 | 14.83 |
| S6 | | −113.3678 | 0.3189 | | | |
| S7 | Fourth Lens | −15.3166 | 0.2200 | 1.671 | 19.2 | −25.33 |
| S8 | | −141.0079 | 0.2777 | | | |
| S9 | Fifth Lens | 6.3283 | 0.2200 | 1.614 | 25.9 | −19.01 |
| S10 | | 4.0630 | 0.3069 | | | |
| S11 | Sixth Lens | 6.2159 | 0.4633 | 1.567 | 37.4 | 4.22 |
| S12 | | −3.8296 | 0.7559 | | | |
| S13 | Seventh Lens | 25.0009 | 0.4808 | 1.535 | 55.7 | −3.32 |
| S14 | | 1.6530 | 0.1800 | | | |
| S15 | Filter | Infinity | 0.1100 | 1.517 | 64.2 | |
| S16 | | Infinity | 0.7000 | | | |
| S17 | Imaging Plane | Infinity | | | | |

In the example optical imaging system according to the third example embodiment, a total focal length f may be 4.69 mm, IMG HT may be 5.107 mm, FOV may be 92.6°, SAG42 may be −0.2908 mm, SAG52 may be −0.4991 mm, SAG62 may be −0.9065 mm, and SAG72 may be −1.1628 mm.

In the third example embodiment, the first lens 310 may have positive refractive power, the first surface of the first lens 310 may be convex, and the second surface of the first lens 310 may be concave.

The second lens 320 may have negative refractive power, the first surface of the second lens 320 may be convex, and the second surface of the second lens 320 may be concave.

The third lens 330 may have positive refractive power, and the first surface of the third lens 330 may be convex, and the second surface of the third lens 330 may be convex.

The fourth lens 340 may have negative refractive power, the first surface of the fourth lens 340 may be concave, and the second surface of the fourth lens 340 may be convex.

The fifth lens 350 may have negative refractive power, the first surface of the fifth lens 350 may be convex in the paraxial region, and the second surface of the fifth lens 350 may be concave in a paraxial region.

At least one inflection point may be formed on at least one of the first surface and the second surface of the fifth lens 350. In an example, the first surface of the fifth lens 350 may be convex in the paraxial region and concave in a portion or region other than the paraxial region. The second surface of the fifth lens 350 may be concave in the paraxial region and convex in a portion or region other than the paraxial region.

The sixth lens 360 may have positive refractive power, and the first surface of the sixth lens 360 may be convex in the paraxial region, and the second surface of the sixth lens 360 may be convex in the paraxial region.

At least one inflection point may be formed on at least one of the first surface and the second surface of the sixth lens 360. In an example, the first surface of the sixth lens 360 may be convex in the paraxial region and concave in a portion or region other than the paraxial region. The second surface of the sixth lens 360 may be convex in the paraxial region and concave in a portion or region other than the paraxial region.

The seventh lens 370 may have negative refractive power, the first surface of the seventh lens 370 may be convex in the paraxial region, and the second surface of the seventh lens 370 may be concave in the paraxial region.

At least one inflection point may be formed on at least one of the first surface and the second surface of the seventh lens 370. In an example, the first surface of the seventh lens 370 may be convex in the paraxial region and concave in a portion or region other than the paraxial region. The second surface of the seventh lens 370 may be concave in the paraxial region and convex in a portion or region other than the paraxial region.

Each surface of the first lens 310 to the seventh lens 370 may have an aspherical coefficient, as illustrated in Table 6 below. In an example, both the object-side surfaces and the image-side surfaces of the first lens 310 to the seventh lens 370 may be aspherical.

TABLE 6

| | Surface No. | | | | | | |
|---|---|---|---|---|---|---|---|
| | S1 | S2 | S3 | S4 | S5 | S6 | S7 |
| Conic Coefficient (K) | −2.178 | −48.096 | 41.122 | 13.842 | 0.000 | 0.000 | 0.000 |
| 4th Coefficient(A) | 1.117E−02 | −1.890E−02 | −3.759E−02 | −4.014E−02 | −5.977E−02 | −2.542E−02 | −1.017E−01 |
| 6th Coefficient(B) | 1.436E−01 | 1.085E−01 | −1.996E−02 | 5.809E−01 | 9.790E−01 | −2.039E−03 | 2.137E−01 |
| 8th Coefficient(C) | 6.276E−01 | 1.022E+00 | 5.811E−01 | 8.834E+00 | 1.235E+01 | 5.145E−01 | −5.878E−01 |
| 10th Coefficient(D) | 1.532E+00 | 5.173E+00 | 2.954E+00 | 7.750E+01 | 9.913E+01 | 4.760E+00 | 3.735E+00 |
| 12th Coefficient(E) | 1.827E+00 | 1.644E+01 | 9.066E+00 | 4.260E+02 | 5.357E+02 | 2.181E+01 | 4.056E+01 |
| 14th Coefficient(F) | 4.467E−01 | 3.541E+01 | 1.734E+01 | 1.575E+03 | 2.019E+03 | 6.116E+01 | 1.837E+02 |
| 16th Coefficient(G) | 5.282E+00 | 5.397E+01 | 1.882E+01 | 4.083E+03 | 5.419E+03 | 1.124E+02 | 5.124E+02 |
| 18th Coefficient(H) | 9.208E+00 | 5.935E+01 | 5.209E+00 | 7.569E+03 | 1.048E+04 | 1.381E+02 | 9.642E+02 |
| 20th Coefficient(J) | 9.042E+00 | 4.735E+01 | 1.616E+01 | 1.010E+04 | 1.460E+04 | 1.127E+02 | 1.264E+03 |
| 22nd Coefficient(L) | 5.714E+00 | 2.715E+01 | 2.713E+01 | 9.631E+03 | 1.452E+04 | 5.864E+01 | 1.158E+03 |

TABLE 6-continued

| | | | | | | | |
|---|---|---|---|---|---|---|---|
| 24th Coefficient(M) | 2.375E+00 | 1.090E+01 | 2.143E+01 | 6.402E+03 | 1.004E+04 | 1.760E+01 | 7.297E+02 |
| 26th Coefficient(N) | 6.299E−01 | 2.910E+00 | 9.733E+00 | 2.818E+03 | 4.581E+03 | 2.322E+00 | 3.013E+02 |
| 28th Coefficient(O) | 9.690E−02 | −4.635E−01 | 2.446E+00 | 7.381E+02 | 1.240E+03 | 0.000E+00 | 7.349E+01 |
| 30th Coefficient(P) | 6.591E−03 | 3.332E−02 | 2.650E−01 | 8.707E+01 | 1.508E+02 | 0.000E+00 | 8.032E+00 |

| | Surface No. | | | | | | |
|---|---|---|---|---|---|---|---|
| | S8 | S9 | S10 | S11 | S12 | S13 | S14 |
| Conic Coefficient (K) | 0.000 | −32.144 | 0.000 | 5.340 | −6.079 | 0.000 | −5.080 |
| 4th Coefficient(A) | 9.757E−02 | −1.753E−01 | −2.244E−01 | 4.125E−02 | 5.888E−02 | −2.585E−01 | −1.833E−01 |
| 6th Coefficient(B) | 4.119E−02 | −3.288E−01 | −1.698E−01 | −1.872E−01 | −2.315E−02 | 1.884E−01 | 1.550E−01 |
| 8th Coefficient(C) | 5.312E−01 | 2.319E+00 | 1.177E+00 | 3.707E−01 | 2.338E−02 | −1.128E−01 | −9.782E−02 |
| 10th Coefficient(D) | 3.929E+00 | 6.963E+00 | 3.049E+00 | −5.642E−01 | −4.179E−02 | 5.507E−02 | 4.492E−02 |
| 12th Coefficient(E) | 1.437E+01 | 1.350E+01 | 5.149E+00 | 6.228E−01 | 4.880E−02 | −1.989E−02 | −1.499E−02 |
| 14th Coefficient(F) | 3.450E+01 | 1.817E+01 | 6.119E+00 | −4.995E−01 | −3.964E−02 | 5.176E−03 | 3.661E−03 |
| 16th Coefficient(G) | 5.818E+01 | 1.722E+01 | 5.210E+00 | 2.904E−01 | 2.246E−02 | −9.751E−04 | −6.589E−04 |
| 18th Coefficient(H) | 7.044E+01 | 1.144E+01 | 3.182E+00 | −1.223E−01 | −8.888E−03 | 1.340E−04 | 8.760E−05 |
| 20th Coefficient(J) | 6.143E+01 | 5.193E+00 | 1.379E+00 | 3.711E−02 | 2.467E−03 | −1.346E−05 | −8.562E−06 |
| 22nd Coefficient(L) | 3.818E+01 | 1.533E+00 | −4.135E−01 | −7.989E−03 | −4.783E−04 | 9.766E−07 | 6.061E−07 |
| 24th Coefficient(M) | 1.647E+01 | 2.644E−01 | 8.203E−02 | 1.187E−03 | 6.344E−05 | −4.993E−08 | −3.018E−08 |
| 26th Coefficient(N) | 4.674E+00 | −2.017E−02 | −9.887E−03 | −1.155E−04 | −5.488E−06 | 1.706E−09 | 1.001E−09 |
| 28th Coefficient(O) | 7.829E−01 | 0.000E+00 | 6.022E−04 | 6.608E−06 | 2.791E−07 | −3.501E−11 | −1.982E−11 |
| 30th Coefficient(P) | 5.843E−02 | 0.000E+00 | −1.028E−05 | −1.686E−07 | −6.329E−09 | 3.262E−13 | 1.772E−13 |

Figure 6:
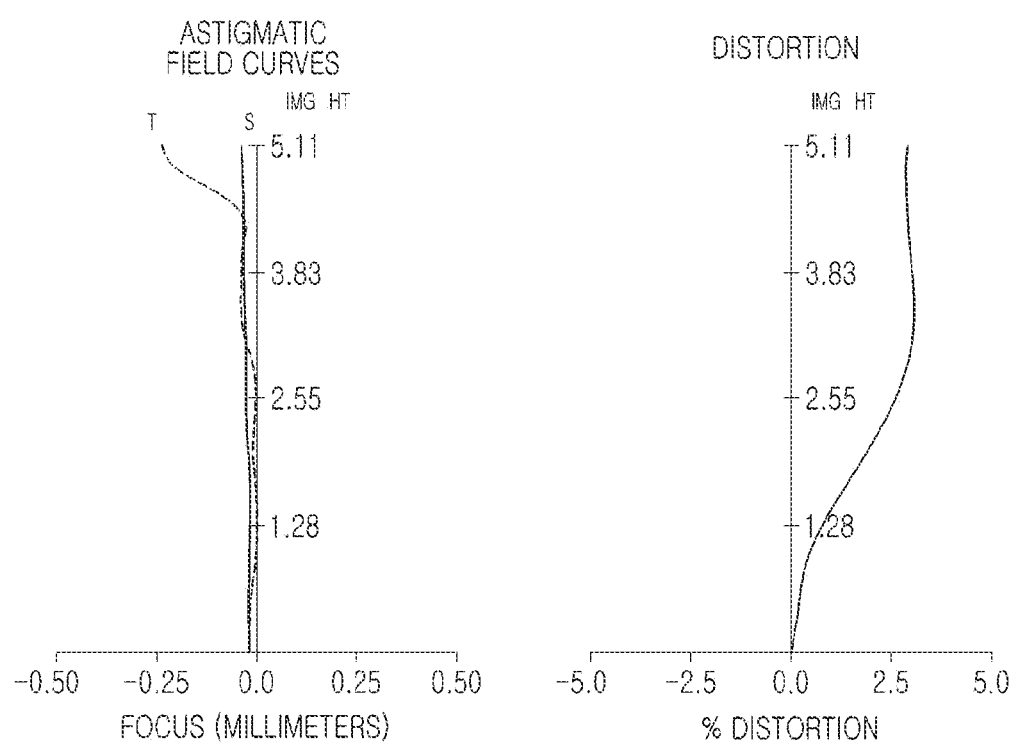
FIG. 6 is a diagram illustrating aberration properties of the example optical imaging system illustrated in FIG. 5.

The above-configured optical imaging system may have aberration properties illustrated in FIG. 6.

Figure 7:
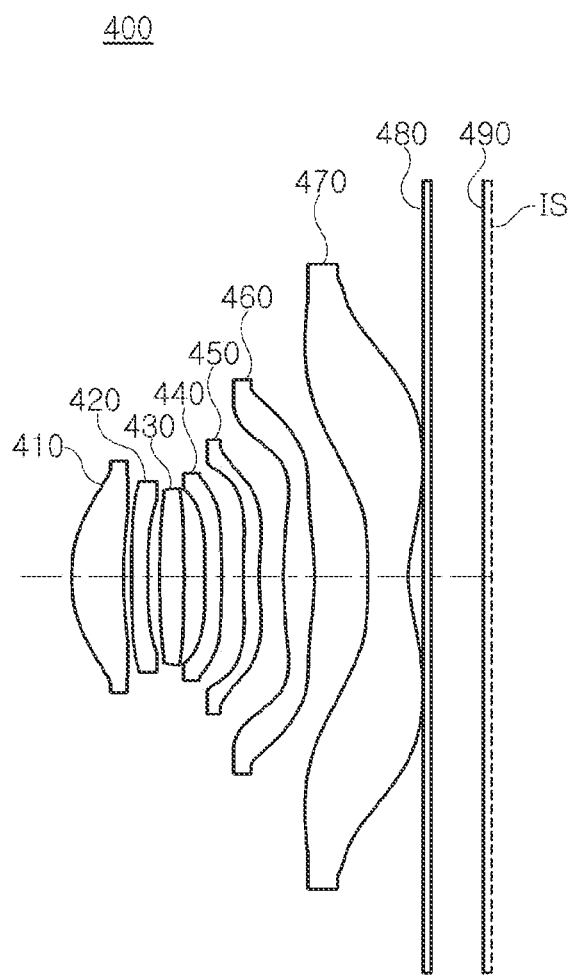
FIG. 7 is a diagram illustrating an example optical imaging system according to a fourth example embodiment.

An example optical imaging system according to a fourth example embodiment will be described with reference to FIGS. 7 and 8.

An example optical imaging system 400 in the fourth example embodiment may include an optical system including a first lens 410, a second lens 420, a third lens 430, a fourth lens 440, a fifth lens 450, a sixth lens 460, and a seventh lens 470, and may further include a filter 480 and an image sensor IS.

The example optical imaging system in the fourth example embodiment may form a focus on an imaging plane 490. The imaging plane 490 may refer to a surface on which a focus is formed by an optical imaging system. In an example, the imaging plane 490 may refer to one surface of the image sensor IS on which light is received.

The lens properties (a radius of curvature, a thickness of the lens or a distance between the lenses, a refractive index, an Abbe number, and a focal length) of each lens are listed in Table 7 below.

TABLE 7

| Surface No. | Note | Radius of Curvature | Thickness or Distance | Refractive Index | Abbe Number | Focal Length |
|---|---|---|---|---|---|---|
| S1 | First Lens | 1.9052 | 0.6837 | 1.544 | 56.0 | 5.18 |
| S2 | | 5.0936 | 0.1058 | | | |
| S3 | Second Lens | 8.2142 | 0.2200 | 1.671 | 19.2 | −21.12 |
| S4 | | 5.1655 | 0.1656 | | | |
| S5 | Third Lens | 11.4065 | 0.3139 | 1.535 | 55.7 | 17.47 |
| S6 | | −52.3968 | 0.2822 | | | |
| S7 | Fourth Lens | −17.7660 | 0.2200 | 1.671 | 19.2 | −22.72 |
| S8 | | 117.6799 | 0.2929 | | | |
| S9 | Fifth Lens | 5.2056 | 0.2200 | 1.614 | 25.9 | −28.2 |
| S10 | | 3.9464 | 0.3166 | | | |
| S11 | Sixth Lens | 6.2102 | 0.4078 | 1.567 | 37.4 | 4.46 |
| S12 | | −4.2063 | 0.7081 | | | |
| S13 | Seventh Lens | 15.7321 | 0.5534 | 1.535 | 55.7 | −3.5 |
| S14 | | 1.6607 | 0.2000 | | | |
| S15 | Filter | Infinity | 0.1100 | 1.517 | 64.2 | |
| S16 | | Infinity | 0.7000 | | | |
| S17 | Imaging Plane | Infinity | | | | |

In the example optical imaging system in the fourth example embodiment, a total focal length f may be 4.67 mm, IMG HT may be 5.107 mm, FOV may be 92.6°, SAG42 may be −0.2803 mm, SAG52 may be −0.5284 mm, SAG62 may be −0.8368 mm, and SAG72 may be −0.9436 mm.

In the fourth example embodiment, the first lens 410 may have positive refractive power, the first surface of the first lens 410 may be convex, and the second surface of the first lens 410 may be concave.

The second lens 420 may have negative refractive power, the first surface of the second lens 420 may be convex, and the second surface of the second lens 420 may be concave.

The third lens 430 may have positive refractive power, and the first surface of the third lens 430 may be convex, and the second surface of the third lens 430 may be convex.

The fourth lens 440 may have negative refractive power, and the first surface of the fourth lens 440 may be concave, and the second surface of the fourth lens 440 may be concave.

The fifth lens 450 may have negative refractive power, the first surface of the fifth lens 450 may be convex in a paraxial region, and the second surface of the fifth lens 450 may be concave in the paraxial region.

At least one inflection point may be formed on at least one of the first surface and the second surface of the fifth lens 450. In an example, the first surface of the fifth lens 450 may be convex in the paraxial region and concave in a portion or region other than the paraxial region. The second surface of the fifth lens 450 may be concave in the paraxial region and convex in a portion or region other than the paraxial region.

The sixth lens 460 may have positive refractive power, and the first surface of the sixth lens 460 may be convex in the paraxial region, and the second surface of the sixth lens 460 may be convex in the paraxial region.

At least one inflection point may be formed on at least one of the first surface and the second surface of the sixth lens 460. In an example, the first surface of the sixth lens 460 may be convex in the paraxial region and concave in a portion or region other than the paraxial region. The second surface of the sixth lens 460 may be convex in the paraxial region and concave in a portion or region other than the paraxial region.

The seventh lens 470 may have negative refractive power, the first surface of the seventh lens 470 may be convex in the paraxial region, and the second surface of the seventh lens 470 may be concave in the paraxial region.

At least one inflection point may be formed on at least one of the first surface and the second surface of the seventh lens 470. In an example, the first surface of the seventh lens 470 may be convex in the paraxial region and concave in a portion or region other than the paraxial region. The second surface of the seventh lens 470 may be concave in the paraxial region and convex in a portion or region other than the paraxial region.

Each surface of the first lens 410 to the seventh lens 470 may have an aspherical coefficient, as illustrated in Table 8 below. In an example, both the object-side surfaces and the image-side surfaces of the first lens 410 to the seventh lens 470 may be aspherical.

TABLE 8

| | Surface No. | | | | | | |
|---|---|---|---|---|---|---|---|
| | S1 | S2 | S3 | S4 | S5 | S6 | S7 |
| Conic Coefficient (K) | −1.862 | −37.476 | 12.220 | 14.181 | 0.000 | 0.000 | 0.000 |
| 4th Coefficient(A) | 2.983E−03 | 1.778E−02 | −2.658E−02 | −1.055E−01 | −3.107E−02 | 2.260E−02 | −1.357E−01 |
| 6th Coefficient(B) | 2.037E−01 | −2.826E−01 | −4.834E−01 | 1.800E+00 | 5.252E−01 | −6.520E−01 | 7.266E−01 |
| 8th Coefficient(C) | 9.329E−01 | 1.583E+00 | 5.457E+00 | 2.236E+01 | 6.802E+00 | 5.602E+00 | 6.251E+00 |
| 10th Coefficient(D) | 2.628E+00 | 5.905E+00 | 3.526E+01 | 1.719E+02 | 5.443E+01 | 2.904E+01 | 3.474E+01 |
| 12th Coefficient(E) | 4.635E+00 | 1.497E+01 | 1.509E+02 | 8.690E+02 | 2.886E+02 | 9.720E+01 | 1.339E+02 |
| 14th Coefficient(F) | 4.798E+00 | 2.652E+01 | 4.456E+02 | 3.033E+03 | 1.059E+03 | 2.193E+02 | 3.693E+02 |
| 16th Coefficient(G) | 1.899E+00 | 3.336E+01 | 9.301E+02 | 7.528E+03 | 2.765E+03 | 3.404E+02 | 7.419E+02 |
| 18th Coefficient(H) | 1.999E+00 | 3.000E+01 | 1.391E+03 | 1.349E+04 | 5.197E+03 | 3.644E+02 | 1.094E+03 |
| 20th Coefficient(J) | 3.759E+00 | 1.921E+01 | 1.495E+03 | 1.753E+04 | 7.050E+03 | 2.644E+02 | 1.182E+03 |
| 22nd Coefficient(L) | 2.925E+00 | 8.607E+00 | 1.144E+03 | 1.634E+04 | 6.833E+03 | 1.241E+02 | 9.214E+02 |
| 24th Coefficient(M) | 1.343E+00 | 2.604E+00 | 6.074E+02 | 1.065E+04 | 4.612E+03 | 3.403E+01 | 5.035E+02 |
| 26th Coefficient(N) | 3.757E−01 | −4.968E−01 | 2.126E+02 | 4.608E+03 | 2.058E+03 | 4.136E+00 | 1.825E+02 |
| 28th Coefficient(O) | 5.953E−02 | 5.202E−02 | 4.408E+01 | 1.188E+03 | 5.454E+02 | 0.000E+00 | 3.927E+01 |
| 30th Coefficient(P) | 4.110E−03 | −2.093E−03 | 4.100E+00 | 1.382E+02 | 6.499E+01 | 0.000E+00 | 3.787E+00 |

| | Surface No. | | | | | | |
|---|---|---|---|---|---|---|---|
| | S8 | S9 | S10 | S11 | S12 | S13 | S14 |
| Conic Coefficient (K) | 0.000 | −26.786 | 0.000 | 5.372 | −6.754 | 0.000 | −5.109 |
| 4th Coefficient(A) | 1.074E−01 | −2.049E−01 | −2.662E−01 | −3.489E−03 | 1.766E−02 | −2.320E−01 | −1.490E−01 |
| 6th Coefficient(B) | 1.341E−01 | 2.536E−01 | 2.432E−01 | −5.345E−02 | 8.693E−02 | 1.389E−01 | 1.091E−01 |

TABLE 8-continued

| | | | | | | | |
|---|---|---|---|---|---|---|---|
| 8th Coefficient(C) | 1.843E−01 | −6.215E−01 | −4.619E−01 | 1.318E−01 | −1.889E−01 | −5.459E−02 | −5.952E−02 |
| 10th Coefficient(D) | 7.096E−01 | 1.687E+00 | 9.751E−01 | −2.428E−01 | 2.943E−01 | 1.579E−02 | 2.407E−02 |
| 12th Coefficient(E) | 4.181E+00 | 3.248E+00 | 1.653E+00 | 3.148E−01 | −3.149E−01 | −3.489E−03 | −7.207E−03 |
| 14th Coefficient(F) | 1.036E+01 | 4.062E+00 | 2.121E+00 | −2.982E−01 | 2.222E−01 | 6.160E−04 | 1.597E−03 |
| 16th Coefficient(G) | 1.513E+01 | 3.304E+00 | 2.101E+00 | 2.009E−01 | −1.065E−01 | −8.999E−05 | −2.622E−04 |
| 18th Coefficient(H) | 1.349E+01 | 1.725E+00 | 1.621E+00 | −9.499E−02 | 3.567E−02 | 1.088E−05 | 3.187E−05 |
| 20th Coefficient(J) | 6.449E+00 | −5.499E−01 | −9.563E−01 | 3.137E−02 | −8.467E−03 | −1.051E−06 | −2.848E−06 |
| 22nd Coefficient(L) | 2.058E−01 | 9.347E−02 | 4.154E−01 | −7.171E−03 | 1.421E−03 | 7.728E−08 | 1.840E−07 |
| 24th Coefficient(M) | 1.736E+00 | −4.901E−03 | −1.263E−01 | 1.110E−03 | −1.650E−04 | −4.091E−09 | −8.342E−09 |
| 26th Coefficient(N) | 1.066E+00 | −4.033E−04 | 2.511E−02 | −1.109E−04 | 1.262E−05 | 1.455E−10 | 2.513E−10 |
| 28th Coefficient(O) | 2.858E−01 | 0.000E+00 | −2.916E−03 | 6.453E−06 | −5.717E−07 | −3.098E−12 | −4.512E−12 |
| 30th Coefficient(P) | 3.052E−02 | 0.000E+00 | 1.492E−04 | −1.662E−07 | 1.162E−08 | 2.974E−14 | 3.650E−14 |

Figure 8:
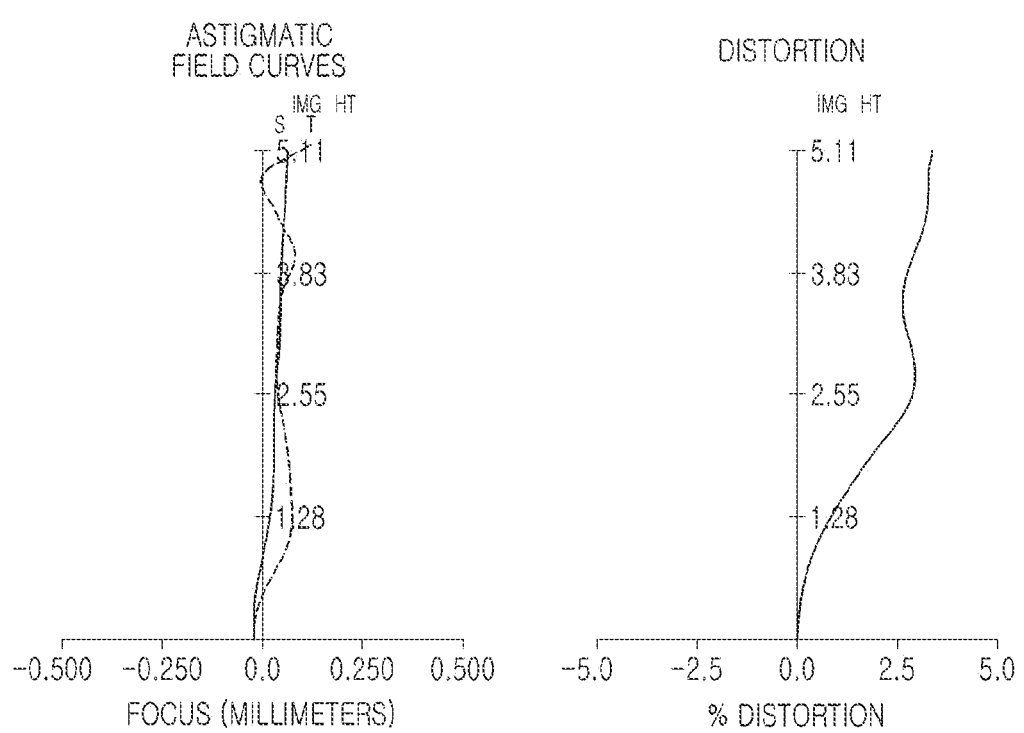
FIG. 8 is a diagram illustrating aberration properties of the example optical imaging system illustrated in FIG. 7.

The above-configured optical imaging system may have aberration properties illustrated in FIG. 8.

Figure 9:
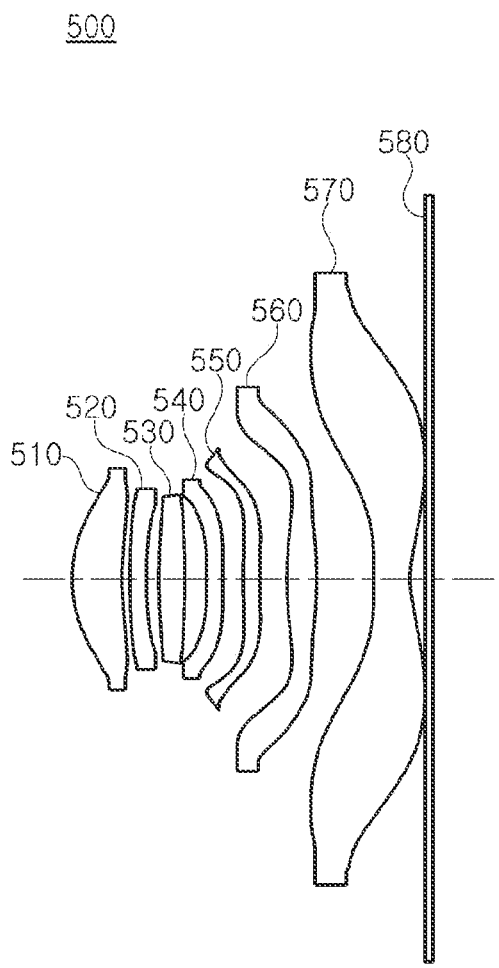
FIG. 9 is a diagram illustrating an example optical imaging system according to a fifth example embodiment.

An example optical imaging system according to a fifth example embodiment will be described with reference to FIGS. 9 and 10.

An optical imaging system 500 in the fifth example embodiment may include an optical system including a first lens 510, a second lens 520, a third lens 530, a fourth lens 540, a fifth lens 550, a sixth lens 560, and a seventh lens 570, and may further include a filter 580 and an image sensor IS.

The example optical imaging system in the fifth example embodiment may form a focus on an imaging plane 590. The imaging plane 590 may refer to a surface on which a focus is formed by an optical imaging system. In an example, the imaging plane 590 may refer to one surface of the image sensor IS on which light is received.

The lens properties (a radius of curvature, a thickness of the lens or a distance between the lenses, a refractive index, an Abbe number, and a focal length) of each lens are listed in Table 9 below.

TABLE 9

| Surface No. | Note | Radius of Curvature | Thickness or Distance | Refractive Index | Abbe Number | Focal Length |
|---|---|---|---|---|---|---|
| S1 | First Lens | 1.9413 | 0.6799 | 1.544 | 56.0 | 5.16 |
| S2 | | 5.4697 | 0.1070 | | | |
| S3 | Second Lens | 8.7156 | 0.2200 | 1.671 | 19.2 | −18.24 |
| S4 | | 5.0630 | 0.1698 | | | |
| S5 | Third Lens | 10.6084 | 0.3491 | 1.535 | 55.7 | 14.93 |
| S6 | | −32.4781 | 0.2922 | | | |
| S7 | Fourth Lens | −11.7660 | 0.2200 | 1.671 | 19.2 | −16.7 |
| S8 | | 315.1824 | 0.2787 | | | |
| S9 | Fifth Lens | 4.7500 | 0.2200 | 1.614 | 25.9 | 1052.86 |
| S10 | | 4.7000 | 0.3710 | | | |
| S11 | Sixth Lens | 6.2257 | 0.4026 | 1.567 | 37.4 | 5.02 |
| S12 | | −5.1805 | 0.7631 | | | |
| S13 | Seventh Lens | 15.9887 | 0.5117 | 1.535 | 55.7 | −3.57 |
| S14 | | 1.6921 | 0.2000 | | | |
| S15 | Filter | Infinity | 0.1100 | 1.517 | 64.2 | |
| S16 | | Infinity | 0.6050 | | | |

TABLE 9-continued

| Surface No. | Note | Radius of Curvature | Thickness or Distance | Refractive Index | Abbe Number | Focal Length |
|---|---|---|---|---|---|---|
| S17 | Imaging Plane | Infinity | | | | |

In the example optical imaging system in the fifth example embodiment, a total focal length f may be 4.59 mm, IMG HT may be 5.107 mm, FOV may be 93.2°, SAG42 may be −0.3066 mm, SAG52 may be −0.5446 mm, SAG62 may be −0.7909 mm, and SAG72 may be −0.8603 mm.

In the fifth example embodiment, the first lens 510 may have positive refractive power, the first surface of the first lens 510 may be convex, and the second surface of the first lens 510 may be concave.

The second lens 520 may have negative refractive power, the first surface of the second lens 520 may be convex, and the second surface of the second lens 520 may be concave.

The third lens 530 may have positive refractive power, and the first surface of the third lens 530 may be convex, and the second surface of the third lens 530 may be convex.

The fourth lens 540 may have negative refractive power, and the first surface of the fourth lens 540 may be concave, and the second surface of the fourth lens 540 may be concave.

The fifth lens 550 may have positive refractive power, the first surface of the fifth lens 550 may be convex in the paraxial region, and the second surface of the fifth lens 550 may be concave in a paraxial region.

At least one inflection point may be formed on at least one of the first surface and the second surface of the fifth lens 550. In an example, the first surface of the fifth lens 550 may be convex in the paraxial region and concave in a portion or region other than the paraxial region. The second surface of the fifth lens 550 may be concave in the paraxial region and convex in a portion or region other than the paraxial region.

The sixth lens 560 may have positive refractive power, and the first surface of the sixth lens 560 may be convex in the paraxial region, and the second surface of the sixth lens 560 may be convex in the paraxial region.

At least one inflection point may be formed on at least one of the first surface and the second surface of the sixth lens 560. In an example, the first surface of the sixth lens 560 may be convex in the paraxial region and concave in a portion or region other than the paraxial region. The second surface of the sixth lens 560 may be convex in the paraxial region and concave in a portion or region other than the paraxial region.

The seventh lens 570 may have negative refractive power, the first surface of the seventh lens 570 may be convex in the paraxial region, and the second surface of the seventh lens 570 may be concave in the paraxial region.

At least one inflection point may be formed on at least one of the first surface and the second surface of the seventh lens 570. In an example, the first surface of the seventh lens 570 may be convex in the paraxial region and concave in a portion or region other than the paraxial region. The second surface of the seventh lens 570 may be concave in the paraxial region and convex in a portion or region other than the paraxial region.

Each surface of the first lens 510 to the seventh lens 570 may have an aspherical coefficient, as illustrated in Table 10 below. In an example, both the object-side surfaces and the image-side surfaces of the first lens 510 to the seventh lens 570 may be aspherical.

TABLE 10

| | Surface No. | | | | | | |
|---|---|---|---|---|---|---|---|
| | S1 | S2 | S3 | S4 | S5 | S6 | S7 |
| Conic Coefficient (K) | −1.890 | −38.268 | 15.522 | 13.882 | 9.426 | −35.186 | 43.011 |
| 4th Coefficient(A) | 2.174E−02 | −1.955E−02 | −6.417E−02 | −1.825E−02 | −8.576E−03 | −1.644E−02 | −1.177E−01 |
| 6th Coefficient(B) | 5.186E−02 | 9.062E−02 | 3.090E−01 | −1.120E−01 | 7.135E−02 | −1.209E−01 | 5.110E−02 |
| 8th Coefficient(C) | −2.024E−01 | −5.474E−01 | 2.630E+00 | 6.281E−01 | 1.919E+00 | 1.689E+00 | 1.487E+00 |
| 10th Coefficient(D) | 2.661E−01 | 1.903E+00 | 1.596E+01 | 2.822E+00 | 2.157E+01 | 1.239E+01 | 1.744E+01 |
| 12th Coefficient(E) | 6.342E−01 | 4.313E+00 | 6.353E+01 | 4.713E+01 | 1.398E+02 | 5.669E+01 | 9.895E+01 |
| 14th Coefficient(F) | 3.462E+00 | 6.794E+00 | 1.730E+02 | 2.639E+02 | 5.872E+02 | 1.767E+02 | 3.532E+02 |
| 16th Coefficient(G) | 7.290E+00 | 7.841E+00 | 3.322E+02 | 8.711E+02 | 1.690E+03 | 3.921E+02 | 8.575E+02 |
| 18th Coefficient(H) | 9.243E+00 | 6.918E+00 | 4.573E+02 | 1.900E+03 | 3.427E+03 | 6.333E+02 | 1.464E+03 |
| 20th Coefficient(J) | 7.750E+00 | 4.793E+00 | 4.533E+02 | 2.847E+03 | 4.949E+03 | 7.486E+02 | 1.780E+03 |
| 22nd Coefficient(L) | 4.408E+00 | 2.597E+00 | 3.211E+02 | 2.955E+03 | 5.065E+03 | 6.421E+02 | 1.535E+03 |
| 24th Coefficient(M) | 1.686E+00 | 1.056E+00 | 1.588E+02 | 2.089E+03 | 3.590E+03 | 3.892E+02 | 9.190E+02 |
| 26th Coefficient(N) | −4.161E−01 | 2.978E−01 | 5.208E+01 | 9.611E+02 | 1.675E+03 | 1.580E+02 | 3.632E+02 |
| 28th Coefficient(O) | 5.988E−02 | −5.108E−02 | 1.019E+01 | 2.594E+02 | 4.627E+02 | 3.854E+01 | 8.530E+01 |
| 30th Coefficient(P) | −3.818E−03 | 3.968E−03 | 9.018E−01 | 3.116E+01 | 5.732E+01 | 4.263E+00 | 9.018E+00 |

| | Surface No. | | | | | | |
|---|---|---|---|---|---|---|---|
| | S8 | S9 | S10 | S11 | S12 | S13 | S14 |
| Conic Coefficient (K) | 99.000 | −31.843 | 0.720 | 5.354 | −6.472 | −1.196 | −5.061 |
| 4th Coefficient(A) | −1.516E−01 | −2.410E−01 | −2.499E−01 | −1.833E−03 | 3.875E−02 | −2.006E−01 | −1.217E−01 |
| 6th Coefficient(B) | 4.187E−01 | 6.818E−01 | 2.033E−01 | −6.412E−02 | 2.928E−02 | 8.849E−02 | 7.183E−02 |
| 8th Coefficient(C) | 2.222E+00 | 3.292E+00 | −4.528E−01 | 1.306E−01 | −1.125E−01 | −1.217E−02 | −3.070E−02 |
| 10th Coefficient(D) | 9.632E+00 | 1.239E+01 | 1.453E+00 | −1.865E−01 | 2.311E−01 | −6.228E−03 | 9.758E−03 |
| 12th Coefficient(E) | 3.099E+01 | 3.198E+01 | 3.385E+00 | 2.058E−01 | −2.804E−01 | 4.165E−03 | −2.339E−03 |
| 14th Coefficient(F) | 7.192E+01 | 5.746E+01 | 5.319E+00 | −1.887E−01 | 2.097E−01 | −1.254E−03 | 4.252E−04 |
| 16th Coefficient(G) | 1.207E+02 | 7.372E+01 | 5.833E+00 | 1.310E−01 | −1.037E−01 | 2.398E−04 | −5.899E−05 |
| 18th Coefficient(H) | 1.471E+02 | 6.847E+01 | 4.576E+00 | −6.457E−02 | 3.536E−02 | −3.169E−05 | 6.276E−06 |
| 20th Coefficient(J) | 1.300E+02 | 4.612E+01 | 2.586E+00 | 2.211E−02 | −8.486E−03 | 2.973E−06 | −5.089E−07 |
| 22nd Coefficient(L) | 8.233E+01 | 2.228E+01 | 1.042E+00 | −5.194E−03 | 1.434E−03 | −1.984E−07 | 3.085E−08 |
| 24th Coefficient(M) | 3.638E+01 | 7.508E+00 | −2.909E−01 | 8.201E−04 | −1.671E−04 | 9.238E−09 | −1.348E−09 |

TABLE 10-continued

| | | | | | | | |
|---|---|---|---|---|---|---|---|
| 26th Coefficient(N) | 1.064E+01 | 1.674E+00 | 5.332E−02 | −8.314E−05 | 1.281E−05 | −2.856E−10 | 3.991E−11 |
| 28th Coefficient(O) | 1.852E+00 | −2.214E−01 | −5.754E−03 | 4.889E−06 | −5.809E−07 | 5.279E−12 | −7.126E−13 |
| 30th Coefficient(P) | 1.450E−01 | 1.313E−02 | 2.765E−04 | −1.269E−07 | 1.181E−08 | −4.418E−14 | 5.772E−15 |

Figure 10:
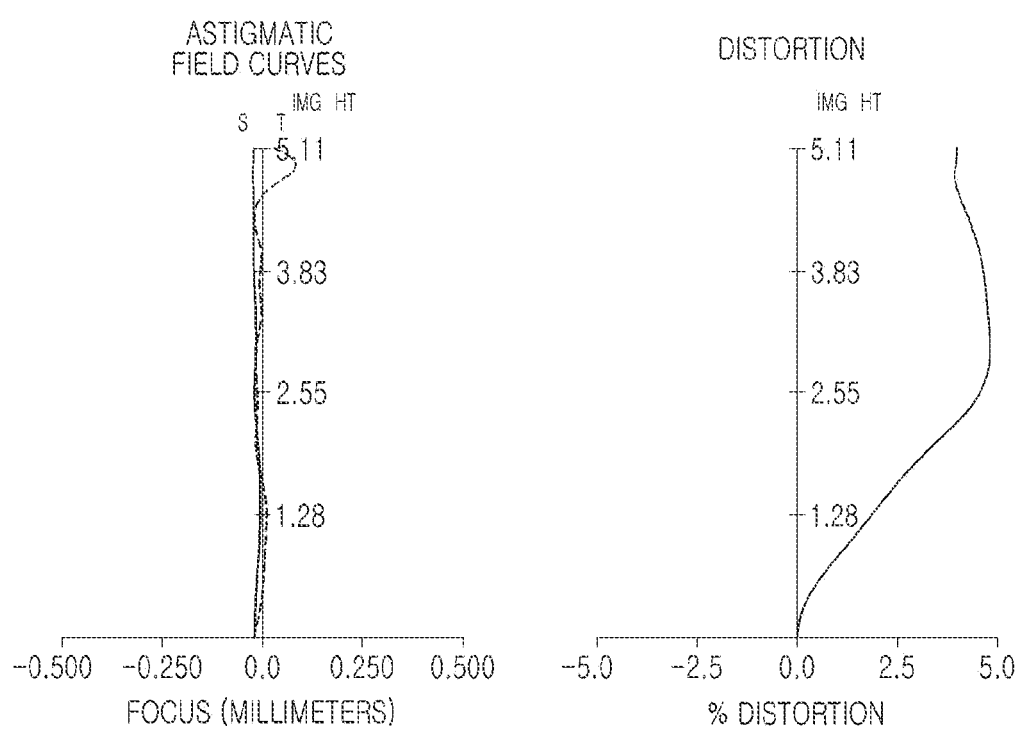
FIG. 10 is a diagram illustrating aberration properties of the example optical imaging system illustrated in FIG. 9.

The above-configured optical imaging system may have aberration properties illustrated in FIG. 10.

Figure 11:
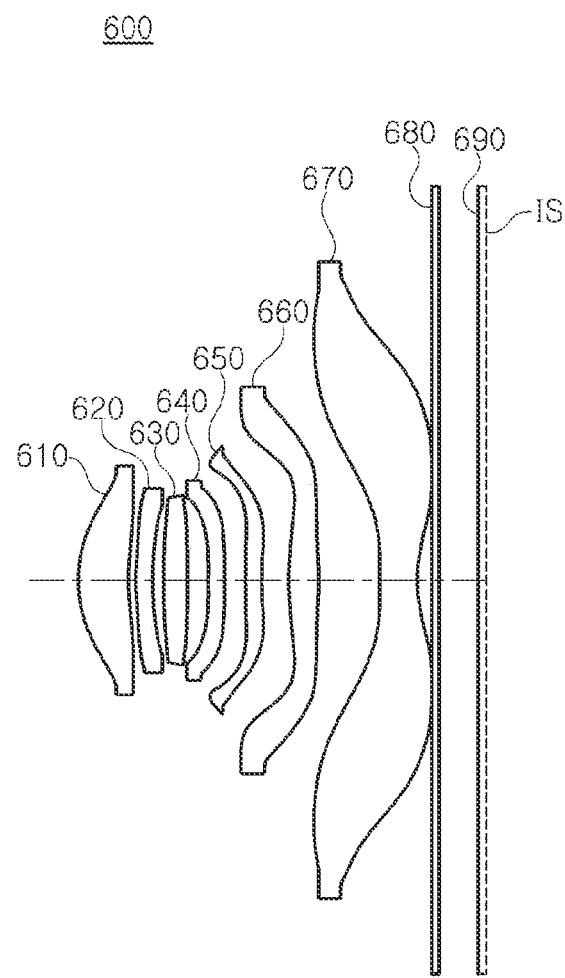
FIG. 11 is a diagram illustrating an example optical imaging system according to a sixth example embodiment.

An example optical imaging system according to a sixth example embodiment will be described with reference to FIGS. 11 and 12.

An example optical imaging system 600 in the sixth example embodiment may include an optical system including a first lens 610, a second lens 620, a third lens 630, a fourth lens 640, a fifth lens 650, a sixth lens 660, and a seventh lens 670, and may further include a filter 680 and an image sensor IS.

The example optical imaging system in the sixth example embodiment may form a focus on an imaging plane 690. The imaging plane 690 may refer to a surface on which a focus is formed by an optical imaging system. In an example, the imaging plane 690 may refer to one surface of the image sensor IS on which light is received.

The lens properties (a radius of curvature, a thickness of the lens or a distance between the lenses, a refractive index, an Abbe number, and a focal length) of each lens are listed in Table 11 below.

TABLE 11

| Surface No. | Note | Radius of Curvature | Thickness or Distance | Refractive Index | Abbe Number | Focal Length |
|---|---|---|---|---|---|---|
| S1 | First Lens | 1.9231 | 0.6946 | 1.544 | 56.0 | 4.99 |
| S2 | | 5.6905 | 0.1001 | | | |
| S3 | Second Lens | 7.9596 | 0.2200 | 1.671 | 19.2 | −15.4 |
| S4 | | 4.4687 | 0.1585 | | | |
| S5 | Third Lens | 10.7047 | 0.3226 | 1.535 | 55.7 | 14.63 |
| S6 | | −29.2387 | 0.2937 | | | |
| S7 | Fourth Lens | −11.3596 | 0.2200 | 1.671 | 19.2 | −20.08 |
| S8 | | −68.6463 | 0.2904 | | | |
| S9 | Fifth Lens | 5.1420 | 0.2200 | 1.614 | 25.9 | −138.12 |
| S10 | | 4.7713 | 0.3713 | | | |
| S11 | Sixth Lens | 6.1977 | 0.4120 | 1.567 | 37.4 | 5.28 |
| S12 | | −5.7288 | 0.8100 | | | |
| S13 | Seventh Lens | 18.7357 | 0.5374 | 1.535 | 55.7 | −3.45 |
| S14 | | 1.6676 | 0.2000 | | | |
| S15 | Filter | Infinity | 0.1100 | 1.517 | 64.2 | |
| S16 | | Infinity | 0.5394 | | | |
| S17 | Imaging Plane | Infinity | | | | |

In the example optical imaging system in the sixth example embodiment, a total focal length f may be 4.63 mm, IMG HT may be 5.107 mm, FOV may be 92.7°, SAG42 may be −0.3279 mm, SAG52 may be −0.5371 mm, SAG62 may be −0.7471 mm, and SAG72 may be −1.0442 mm.

In the sixth example embodiment, the first lens 610 may have positive refractive power, the first surface of the first lens 610 may be convex, and the second surface of the first lens 610 may be concave.

The second lens 620 may have negative refractive power, the first surface of the second lens 620 may be convex, and the second surface of the second lens 620 may be concave.

The third lens 630 may have positive refractive power, and the first surface of the third lens 630 may be convex, and the second surface of the third lens 630 may be convex.

The fourth lens 640 may have negative refractive power, the first surface of the fourth lens 640 may be concave, and the second surface of the fourth lens 640 may be convex.

The fifth lens 650 may have negative refractive power, the first surface of the fifth lens 650 may be convex in the paraxial region, and the second surface of the fifth lens 650 may be concave in a paraxial region.

At least one inflection point may be formed on at least one of the first surface and the second surface of the fifth lens 650. In an example, the first surface of the fifth lens 650 may be convex in the paraxial region and concave in a portion or region other than the paraxial region. The second surface of the fifth lens 650 may be concave in the paraxial region and convex in a portion or region other than the paraxial region.

The sixth lens 660 may have positive refractive power, and the first surface of the sixth lens 660 may be convex in the paraxial region, and the second surface of the sixth lens 660 may be convex in the paraxial region.

At least one inflection point may be formed on at least one of the first surface and the second surface of the sixth lens 660. In an example, the first surface of the sixth lens 660 may be convex in the paraxial region and concave in a portion or region other than the paraxial region. The second surface of the sixth lens 660 may be convex in the paraxial region and concave in a portion or region other than the paraxial region.

The seventh lens 670 may have negative refractive power, the first surface of the seventh lens 670 may be convex in the paraxial region, and the second surface of the seventh lens 670 may be concave in the paraxial region.

At least one inflection point may be formed on at least one of the first surface and the second surface of the seventh lens 670. In an example, the first surface of the seventh lens 670 may be convex in the paraxial region and concave in a portion or region other than the paraxial region. The second surface of the seventh lens 670 may be concave in the paraxial region and convex in a portion or region other than the paraxial region.

Each surface of the first lens 610 to the seventh lens 670 may have an aspherical coefficient, as illustrated in Table 12 below. In an example, both the object-side surfaces and the image-side surfaces of the first lens 610 to the seventh lens 670 may be aspherical.

TABLE 12

| | Surface No. | | | | | | |
|---|---|---|---|---|---|---|---|
| | S1 | S2 | S3 | S4 | S5 | S6 | S7 |
| Conic Coefficient (K) | −1.841 | −39.339 | 20.061 | 12.853 | 18.025 | −99.000 | 43.687 |
| 4th Coefficient(A) | 1.772E−02 | −3.101E−02 | −5.988E−02 | −2.989E−02 | −4.765E−02 | −9.035E−03 | −1.120E−01 |
| 6th Coefficient(B) | 8.446E−02 | 1.602E−01 | 1.170E−01 | −3.397E−02 | 9.203E−01 | −3.539E−01 | 1.226E−01 |
| 8th Coefficient(C) | −4.393E−01 | 1.057E+00 | −5.968E−01 | 3.516E−01 | 1.313E+01 | 4.491E+00 | 1.021E−01 |
| 10th Coefficient(D) | 1.437E+00 | 4.631E+00 | 4.130E+00 | 7.408E−01 | 1.119E+02 | −3.374E+01 | −6.074E+00 |
| 12th Coefficient(E) | −3.131E+00 | −1.380E+01 | −1.838E+01 | −1.403E+01 | −6.203E+02 | 1.656E+02 | 4.159E+01 |
| 14th Coefficient(F) | 4.644E+00 | 2.903E+01 | 5.384E+01 | 6.724E+01 | 2.357E+03 | −5.615E+02 | −1.573E+02 |
| 16th Coefficient(G) | −4.761E+00 | −4.418E+01 | −1.088E+02 | −1.864E+02 | −6.333E+03 | 1.356E+03 | 3.847E+02 |
| 18th Coefficient(H) | 3.377E+00 | 4.908E+01 | 1.559E+02 | 3.428E+02 | 1.222E+04 | −2.365E+03 | −6.429E+02 |
| 20th Coefficient(J) | −1.628E+00 | −3.970E+01 | −1.601E+02 | −4.386E+02 | −1.697E+04 | 2.979E+03 | 7.493E+02 |
| 22nd Coefficient(L) | 5.077E−01 | 2.308E+01 | 1.173E+02 | 3.955E+02 | 1.682E+04 | −2.683E+03 | −6.085E+02 |
| 24th Coefficient(M) | −8.941E−02 | −9.365E+00 | −6.001E+01 | −2.479E+02 | −1.160E+04 | 1.682E+03 | 3.370E+02 |
| 26th Coefficient(N) | 4.473E−03 | 2.515E+00 | 2.038E+01 | 1.033E+02 | 5.281E+03 | −6.958E+02 | −1.210E+02 |
| 28th Coefficient(O) | 1.106E−03 | −4.009E−01 | −4.131E+00 | −2.581E+01 | −1.428E+03 | 1.707E+02 | 2.529E+01 |
| 30th Coefficient(P) | −1.477E−04 | 2.871E−02 | 3.786E−01 | 2.932E+00 | 1.735E+02 | −1.878E+01 | −2.318E+00 |

| | Surface No. | | | | | | |
|---|---|---|---|---|---|---|---|
| | S8 | S9 | S10 | S11 | S12 | S13 | S14 |
| Conic Coefficient (K) | −99.000 | −28.613 | 0.963 | 5.362 | −5.873 | −0.124 | −5.639 |
| 4th Coefficient(A) | −1.121E−01 | −1.637E−01 | −1.945E−01 | 1.397E−02 | 4.292E−02 | −1.952E−01 | −1.121E−01 |
| 6th Coefficient(B) | 1.764E−02 | 6.907E−02 | −7.987E−02 | −8.424E−02 | 4.424E−02 | 8.606E−02 | 6.581E−02 |
| 8th Coefficient(C) | 8.146E−01 | −2.576E−01 | 6.500E−01 | 1.495E−01 | −1.606E−01 | −1.347E−02 | −2.859E−02 |
| 10th Coefficient(D) | −5.948E+00 | 2.337E+00 | −1.550E+00 | −2.272E−01 | 2.749E−01 | −4.322E−03 | 9.215E−03 |
| 12th Coefficient(E) | 2.348E+01 | −8.806E+00 | 2.342E+00 | 2.712E−01 | −2.923E−01 | 3.156E−03 | −2.187E−03 |
| 14th Coefficient(F) | −6.107E+01 | 1.931E+01 | −2.437E+00 | −2.473E−01 | 2.015E−01 | −9.361E−04 | 3.798E−04 |
| 16th Coefficient(G) | 1.107E+02 | −2.797E+01 | 1.747E+00 | 1.629E−01 | −9.445E−02 | 1.731E−04 | −4.857E−05 |
| 18th Coefficient(H) | −1.430E+02 | 2.810E+01 | −8.275E−01 | −7.559E−02 | 3.104E−02 | −2.191E−05 | 4.615E−06 |
| 20th Coefficient(J) | 1.326E+02 | −1.992E+01 | 2.269E−01 | 2.454E−02 | −7.244E−03 | 1.957E−06 | −3.274E−07 |
| 22nd Coefficient(L) | −8.751E+01 | 9.929E+00 | −1.470E−02 | −5.520E−03 | 1.197E−03 | −1.236E−07 | 1.723E−08 |
| 24th Coefficient(M) | 4.012E+01 | −3.403E+00 | −1.268E−02 | 8.412E−04 | −1.371E−04 | 5.423E−09 | −6.558E−10 |
| 26th Coefficient(N) | −1.214E+01 | 7.624E−01 | 4.699E−03 | −8.281E−05 | 1.034E−05 | −1.573E−10 | 1.710E−11 |
| 28th Coefficient(O) | 2.175E+00 | −1.004E−01 | −7.031E−04 | 4.752E−06 | −4.626E−07 | 2.715E−12 | −2.727E−13 |
| 30th Coefficient(P) | −1.748E−01 | 5.887E−03 | 4.095E−05 | −1.207E−07 | 9.294E−09 | −2.114E−14 | 1.996E−15 |

Figure 12:
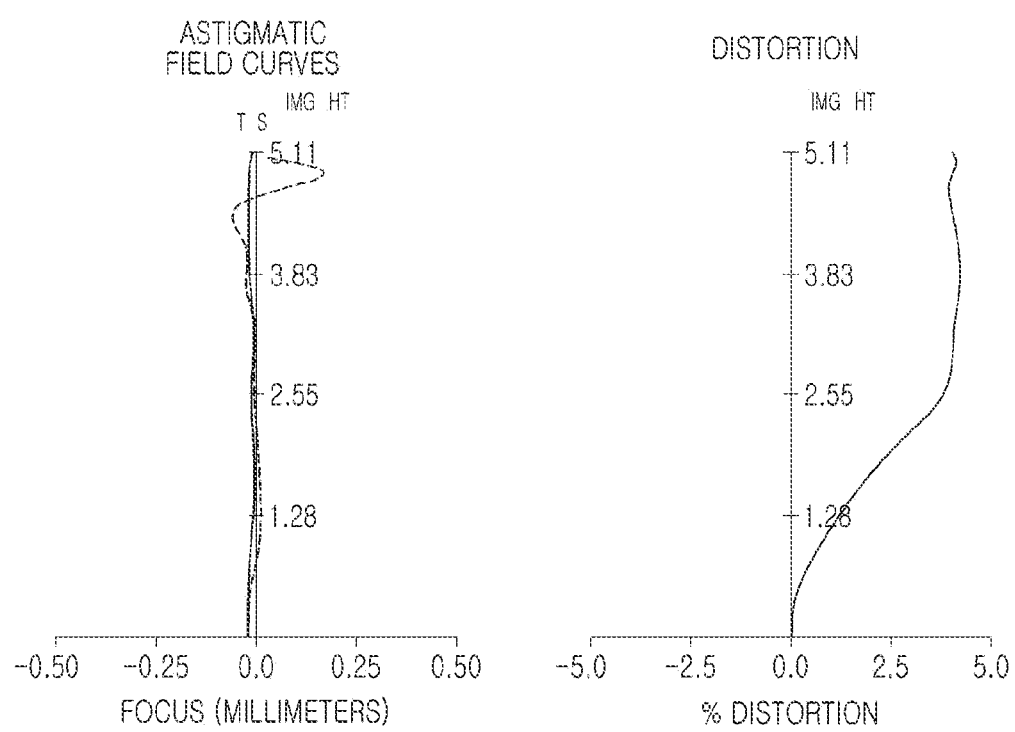
FIG. 12 is a diagram illustrating aberration properties of the example optical imaging system illustrated in FIG. 11.

The above-configured optical imaging system may have aberration properties illustrated in FIG. 12.

Figure 13:
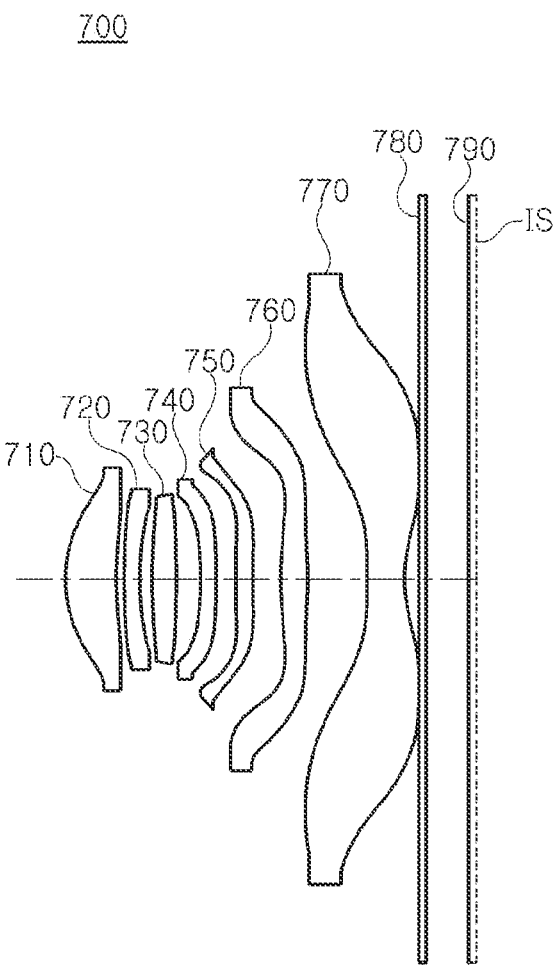
FIG. 13 is a diagram illustrating an example optical imaging system according to a seventh example embodiment.

An example optical imaging system according to a seventh example embodiment will be described with reference to FIGS. 13 and 14.

An example optical imaging system 700 in the seventh example embodiment may include an optical system including a first lens 710, a second lens 720, a third lens 730, a fourth lens 740, a fifth lens 750, a sixth lens 760, and a seventh lens 770, and may further include a filter 780 and an image sensor IS.

The example optical imaging system in the seventh example embodiment may form a focus on an imaging plane 790. The imaging plane 790 may refer to a surface on which a focus is formed by an optical imaging system. In an example, the imaging plane 790 may refer to one surface of the image sensor IS on which light is received.

The lens properties (a radius of curvature, a thickness of the lens or a distance between the lenses, a refractive index, an Abbe number, and a focal length) of each lens are listed in Table 13 below.

TABLE 13

| Surface No. | Note | Radius of Curvature | Thickness or Distance | Refractive Index | Abbe Number | Focal Length |
|---|---|---|---|---|---|---|
| S1 | First Lens | 1.9417 | 0.6812 | 1.544 | 56.0 | 5.14 |
| S2 | | 5.5087 | 0.1142 | | | |
| S3 | Second Lens | 8.3764 | 0.2200 | 1.680 | 18.2 | −17.92 |
| S4 | | 4.9377 | 0.1601 | | | |
| S5 | Third Lens | 10.3676 | 0.3277 | 1.535 | 55.7 | 14.79 |
| S6 | | −33.5769 | 0.3240 | | | |
| S7 | Fourth Lens | −11.4060 | 0.2205 | 1.671 | 19.2 | −16.18 |
| S8 | | 301.9938 | 0.2609 | | | |
| S9 | Fifth Lens | 4.7488 | 0.2252 | 1.614 | 25.9 | 737.69 |
| S10 | | 4.7116 | 0.3738 | | | |
| S11 | Sixth Lens | 6.2278 | 0.4090 | 1.567 | 37.4 | 5.04 |
| S12 | | −5.2227 | 0.7685 | | | |
| S13 | Seventh Lens | 15.8130 | 0.5178 | 1.535 | 55.7 | −3.55 |
| S14 | | 1.6836 | 0.2000 | | | |
| S15 | Filter | Infinity | 0.1100 | 1.517 | 64.2 | |
| S16 | | Infinity | 0.5847 | | | |
| S17 | Imaging Plane | Infinity | | | | |

In the example optical imaging system in the seventh example embodiment, a total focal length f may be 4.59 mm, IMG HT may be 5.107 mm, FOV may be 92.6°, SAG42 may be −0.3144 mm, SAG52 may be −0.5257 mm, SAG62 may be −0.7818 mm, and SAG72 may be −0.8678 mm.

In the seventh example embodiment, the first lens 710 may have positive refractive power, the first surface of the first lens 710 may be convex, and the second surface of the first lens 710 may be concave.

The second lens 720 may have negative refractive power, the first surface of the second lens 720 may be convex, and the second surface of the second lens 720 may be concave.

The third lens 730 may have positive refractive power, and the first surface of the third lens 730 may be convex, and the second surface of the third lens 730 may be convex.

The fourth lens 740 may have negative refractive power, and the first surface of the fourth lens 740 may have a concave shape, and the second surface of the fourth lens 740 may have a concave shape.

The fifth lens 750 may have positive refractive power, the first surface of the fifth lens 750 may be convex in the paraxial region, and the second surface of the fifth lens 750 may be concave in a paraxial region.

At least one inflection point may be formed on at least one of the first surface and the second surface of the fifth lens 750. In an example, the first surface of the fifth lens 750 may be convex in the paraxial region and concave in a portion or region other than the paraxial region. The second surface of the fifth lens 750 may be concave in the paraxial region and convex in a portion or region other than the paraxial region.

The sixth lens 760 may have positive refractive power, and the first surface of the sixth lens 760 may be convex in the paraxial region, and the second surface of the sixth lens 760 may be convex in the paraxial region.

At least one inflection point may be formed on at least one of the first surface and the second surface of the sixth lens 760. In an example, the first surface of the sixth lens 760 may be convex in the paraxial region and concave in a portion or region other than the paraxial region. The second surface of the sixth lens 760 may be convex in the paraxial region and concave in a portion or region other than the paraxial region.

The seventh lens 770 may have negative refractive power, the first surface of the seventh lens 770 may be convex in the paraxial region, and the second surface of the seventh lens 770 may be concave in the paraxial region.

At least one inflection point may be formed on at least one of the first surface and the second surface of the seventh lens 770. In an example, the first surface of the seventh lens 770 may be convex in the paraxial region and concave in a portion or region other than the paraxial region. The second surface of the seventh lens 770 may be concave in the paraxial region and convex in a portion or region other than the paraxial region.

Each surface of the first lens 710 to the seventh lens 770 may have an aspherical coefficient, as illustrated in Table 14 below. In an example, both the object-side surfaces and the image-side surfaces of the first lens 710 to the seventh lens 770 may be aspherical.

TABLE 14

| | Surface No. | | | | | | |
|---|---|---|---|---|---|---|---|
| | S1 | S2 | S3 | S4 | S5 | S6 | S7 |
| Conic Coefficient (K) | −1.888 | −36.395 | 17.687 | 13.687 | −1.914 | −26.283 | 33.497 |
| 4th Coefficient(A) | 2.499E−02 | −3.328E−02 | −6.526E−02 | 2.625E−03 | −1.011E−02 | −1.504E−02 | −1.190E−01 |
| 6th Coefficient(B) | 8.615E−03 | 2.669E−01 | 2.644E−01 | −7.099E−01 | 8.314E−02 | −2.035E−01 | 2.047E−01 |
| 8th Coefficient(C) | 6.501E−02 | −1.794E+00 | −1.591E+00 | 8.934E+00 | −2.299E+00 | 3.004E+00 | −1.216E+00 |
| 10th Coefficient(D) | −7.349E−01 | 7.536E+00 | 6.546E+00 | −6.880E+01 | 2.517E+01 | −2.403E+01 | 6.513E+00 |
| 12th Coefficient(E) | 3.122E+00 | −2.141E+01 | −1.444E+01 | 3.619E+02 | −1.588E+02 | 1.211E+02 | −2.966E+01 |
| 14th Coefficient(F) | −7.787E+00 | 4.295E+01 | 7.779E+00 | −1.346E+03 | 6.532E+02 | −4.150E+02 | 1.029E+02 |
| 16th Coefficient(G) | 1.271E+01 | −6.234E+01 | 4.708E+01 | 3.602E+03 | −1.852E+03 | 1.005E+03 | −2.615E+02 |
| 18th Coefficient(H) | −1.420E+01 | 6.619E+01 | −1.534E+02 | −7.001E+03 | 3.722E+03 | −1.754E+03 | 4.800E+02 |
| 20th Coefficient(J) | 1.108E+01 | −5.136E+01 | 2.435E+02 | 9.873E+03 | −5.348E+03 | 2.211E+03 | −6.311E+02 |
| 22nd Coefficient(L) | −6.027E+00 | 2.877E+01 | −2.399E+02 | −9.985E+03 | 5.462E+03 | −1.996E+03 | 5.867E+02 |
| 24th Coefficient(M) | 2.242E+00 | −1.130E+01 | 1.530E+02 | 7.050E+03 | −3.873E+03 | 1.256E+03 | −3.756E+02 |
| 26th Coefficient(N) | −5.439E−01 | 2.952E+00 | −6.169E+01 | −3.297E+03 | 1.811E+03 | −5.235E+02 | 1.573E+02 |
| 28th Coefficient(O) | 7.748E−02 | −4.597E−01 | 1.434E+01 | 9.171E+02 | −5.022E+02 | 1.297E+02 | −3.879E+01 |
| 30th Coefficient(P) | −4.917E−03 | 3.227E−02 | −1.468E+00 | −1.148E+02 | 6.251E+01 | −1.445E+01 | 4.264E+00 |

| | Surface No. | | | | | | |
|---|---|---|---|---|---|---|---|
| | S8 | S9 | S10 | S11 | S12 | S13 | S14 |
| Conic Coefficient (K) | −99.000 | −29.677 | 0.845 | 5.354 | −6.321 | −2.563 | −5.104 |
| 4th Coefficient(A) | −1.354E−01 | −2.246E−01 | −2.494E−01 | −1.941E−03 | 4.040E−02 | −1.961E−01 | −1.167E−01 |
| 6th Coefficient(B) | 1.801E−01 | 5.019E−01 | 2.262E−01 | −5.770E−02 | 3.056E−02 | 8.780E−02 | 6.683E−02 |
| 8th Coefficient(C) | −5.121E−01 | −2.230E+00 | −5.205E−01 | 1.113E−01 | −1.217E−01 | −1.508E−02 | −2.723E−02 |
| 10th Coefficient(D) | 2.008E+00 | 8.547E+00 | 1.553E+00 | −1.560E−01 | 2.422E−01 | −3.392E−03 | 7.987E−03 |
| 12th Coefficient(E) | −7.992E+00 | −2.261E+01 | −3.421E+00 | 1.720E−01 | −2.869E−01 | 2.797E−03 | −1.691E−03 |
| 14th Coefficient(F) | 2.304E+01 | 4.140E+01 | 5.180E+00 | −1.593E−01 | 2.119E−01 | −8.394E−04 | 2.561E−04 |
| 16th Coefficient(G) | −4.590E+01 | −5.388E+01 | −5.533E+00 | 1.116E−01 | −1.041E−01 | 1.546E−04 | −2.758E−05 |
| 18th Coefficient(H) | 6.397E+01 | 5.058E+01 | 4.252E+00 | −5.516E−02 | 3.537E−02 | −1.935E−05 | 2.093E−06 |
| 20th Coefficient(J) | −6.295E+01 | −3.432E+01 | −2.361E+00 | 1.886E−02 | −8.478E−03 | 1.703E−06 | −1.099E−07 |
| 22nd Coefficient(L) | 4.360E+01 | 1.666E+01 | 9.367E−01 | −4.414E−03 | 1.431E−03 | −1.056E−07 | 3.858E−09 |
| 24th Coefficient(M) | −2.080E+01 | −5.629E+00 | −2.579E−01 | 6.933E−04 | −1.668E−04 | 4.537E−09 | −8.494E−11 |
| 26th Coefficient(N) | 6.510E+00 | 1.256E+00 | 4.667E−02 | −6.983E−05 | 1.278E−05 | −1.285E−10 | 1.049E−12 |
| 28th Coefficient(O) | −1.204E+00 | −1.660E−01 | −4.975E−03 | 4.077E−06 | −5.792E−07 | 2.163E−12 | −6.267E−15 |
| 30th Coefficient(P) | 9.983E−02 | 9.823E−03 | 2.364E−04 | −1.050E−07 | 1.177E−08 | −1.638E−14 | 2.544E−17 |

Figure 14:
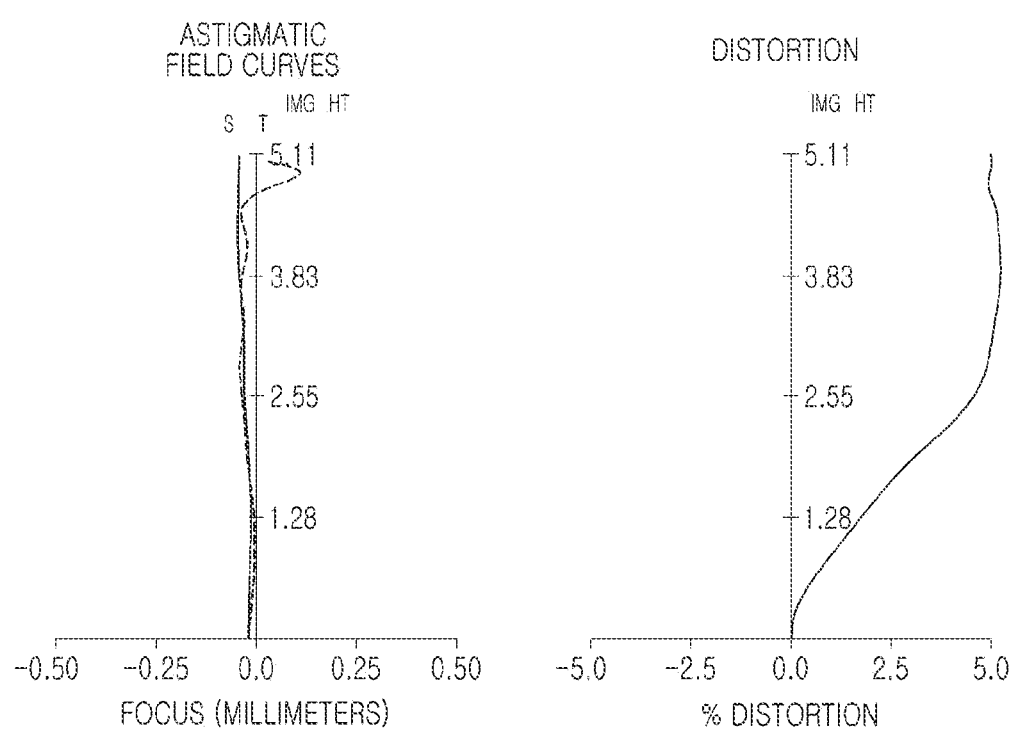
FIG. 14 is a diagram illustrating aberration properties of the example optical imaging system illustrated in FIG. 13.

The above-configured optical imaging system may have aberration properties illustrated in FIG. 14.

Figure 15:
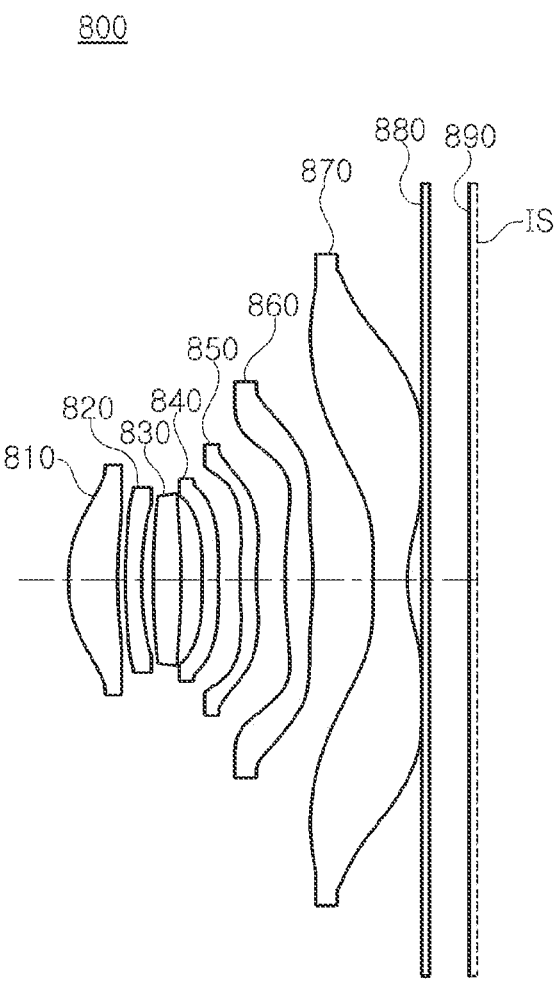
FIG. 15 is a diagram illustrating an example optical imaging system according to an eighth example embodiment.

An example optical imaging system according to an eighth example embodiment will be described with reference to FIGS. 15 and 16.

An example optical imaging system in the eighth example embodiment may include an optical system including a first lens 810, a second lens 820, a third lens 830, a fourth lens 840, a fifth lens 850, a sixth lens 860, and a seventh lens 870, and may further include a filter 880 and an image sensor IS.

The example optical imaging system in the eighth example embodiment may form a focus on an imaging plane 890. The imaging plane 890 may refer to a surface on which a focus is formed by an optical imaging system. In an example, the imaging plane 890 may refer to one surface of the image sensor IS on which light is received.

The lens properties (a radius of curvature, a thickness of the lens or a distance between the lenses, a refractive index, an Abbe number, and a focal length) of each lens are listed in Table 15 below.

TABLE 15

| Surface No. | Note | Radius of Curvature | Thickness or Distance | Refractive Index | Abbe Number | Focal Length |
|---|---|---|---|---|---|---|
| S1 | First Lens | 1.9396 | 0.6782 | 1.544 | 56.0 | 5.12 |
| S2 | | 5.5483 | 0.1129 | | | |
| S3 | Second Lens | 8.1798 | 0.2200 | 1.680 | 18.2 | −17.13 |
| S4 | | 4.7791 | 0.1589 | | | |
| S5 | Third Lens | 10.4680 | 0.3730 | 1.535 | 55.7 | 13.87 |
| S6 | | −25.5247 | 0.2943 | | | |
| S7 | Fourth Lens | −10.3578 | 0.2200 | 1.680 | 18.2 | −20.55 |
| S8 | | −38.9148 | 0.2998 | | | |
| S9 | Fifth Lens | 5.2292 | 0.2276 | 1.635 | 24.0 | −69.16 |
| S10 | | 4.5980 | 0.3838 | | | |
| S11 | Sixth Lens | 6.2519 | 0.3780 | 1.567 | 37.4 | 5.2 |
| S12 | | −5.5352 | 0.8274 | | | |
| S13 | Seventh Lens | 16.6781 | 0.4748 | 1.535 | 55.7 | −3.57 |
| S14 | | 1.7018 | 0.2000 | | | |
| S15 | Filter | Infinity | 0.1100 | 1.517 | 64.2 | |
| S16 | | Infinity | 0.5412 | | | |
| S17 | Imaging Plane | Infinity | | | | |

In the example optical imaging system according to the eighth example embodiment, a total focal length f may be 4.61 mm, IMG HT may be 5.107 mm, FOV may be 93.1°, SAG42 may be −0.3381 mm, SAG52 may be −0.516 mm, SAG62 may be −0.7674 mm, and SAG72 may be −0.9586 mm.

In the eighth example embodiment, the first lens 810 may have positive refractive power, the first surface of the first lens 810 may be convex, and the second surface of the first lens 810 may be concave.

The second lens 820 may have negative refractive power, the first surface of the second lens 820 may be convex, and the second surface of the second lens 820 may be concave.

The third lens 830 may have positive refractive power, and the first surface of the third lens 830 may be convex and the second surface of the third lens 830 may be convex.

The fourth lens 840 may have negative refractive power, the first surface of the fourth lens 840 may be concave, and the second surface of the fourth lens 840 may be convex.

The fifth lens 850 may have negative refractive power, the first surface of the fifth lens 850 may be convex in the paraxial region, and the second surface of the fifth lens 850 may be concave in a paraxial region.

At least one inflection point may be formed on at least one of the first and second surfaces of the fifth lens 850. In an example, the first surface of the fifth lens 850 may be convex in the paraxial region and concave in a portion or region other than the paraxial region. The second surface of the fifth lens 850 may be concave in the paraxial region and convex in a portion or region other than the paraxial region.

The sixth lens 860 may have positive refractive power, and the first surface of the sixth lens 860 may be convex in the paraxial region and the second surface of the sixth lens 860 may be convex in the paraxial region.

At least one inflection point may be formed on at least one of the first surface and the second surface of the sixth lens 860. In an example, the first surface of the sixth lens 860 may be convex in the paraxial region and concave in a portion or region other than the paraxial region. The second surface of the sixth lens 860 may be convex in the paraxial region and concave in a portion or region other than the paraxial region.

The seventh lens 870 may have negative refractive power, the first surface of the seventh lens 870 may be convex in the paraxial region, and the second surface of the seventh lens 870 may be concave in the paraxial region.

At least one inflection point may be formed on at least one of the first surface and the second surface of the seventh lens 870. In an example, the first surface of the seventh lens 870 may be convex in the paraxial region and concave in a portion or region other than the paraxial region. The second surface of the seventh lens 870 may be concave in the paraxial region and convex in a portion or region other than the paraxial region.

Each surface of the first lens 810 to the seventh lens 870 may have an aspherical coefficient, as illustrated in Table 16 below. In an example, both the object-side surfaces and the image-side surfaces of the first lens 810 to the seventh lens 870 may be aspherical.

TABLE 16

| | Surface No. | | | | | | |
|---|---|---|---|---|---|---|---|
| | S1 | S2 | S3 | S4 | S5 | S6 | S7 |
| Conic Coefficient (K) | −1.941 | −36.282 | 17.873 | 12.963 | 12.127 | −94.741 | 33.364 |
| 4th Coefficient(A) | 2.396E−02 | −2.747E−02 | −5.696E−02 | −2.256E−03 | −4.065E−02 | −2.533E−02 | −9.645E−02 |
| 6th Coefficient(B) | 4.923E−02 | 2.211E−01 | 2.454E−01 | −4.740E−01 | 8.606E−01 | 4.490E−03 | 6.894E−02 |
| 8th Coefficient(C) | −3.292E−01 | −1.635E+00 | −1.958E+00 | 5.901E+00 | −1.240E+01 | 5.839E−01 | −5.338E−01 |
| 10th Coefficient(D) | 1.287E+00 | 7.461E+00 | 1.181E+01 | −4.579E+01 | 1.068E+02 | −6.590E+00 | 4.034E+00 |
| 12th Coefficient(E) | −3.305E+00 | −2.288E+01 | −4.758E+01 | 2.462E+02 | −5.986E+02 | 3.706E+01 | −2.273E+01 |
| 14th Coefficient(F) | 5.807E+00 | 4.915E+01 | 1.326E+02 | −9.369E+02 | 2.298E+03 | −1.324E+02 | 8.641E+01 |
| 16th Coefficient(G) | −7.214E+00 | −7.568E+01 | −2.628E+02 | 2.554E+03 | −6.225E+03 | 3.257E+02 | −2.278E+02 |
| 18th Coefficient(H) | 6.455E+00 | 8.441E+01 | 3.755E+02 | −5.022E+03 | 1.209E+04 | −5.706E+02 | 4.257E+02 |
| 20th Coefficient(J) | −4.190E+00 | −6.816E+01 | −3.881E+02 | 7.115E+03 | −1.689E+04 | 7.193E+02 | −5.676E+02 |
| 22nd Coefficient(L) | 1.960E+00 | 3.939E+01 | 2.875E+02 | −7.184E+03 | 1.682E+04 | −6.479E+02 | 5.356E+02 |
| 24th Coefficient(M) | −6.459E−01 | −1.586E+01 | −1.487E+02 | 5.038E+03 | −1.164E+04 | 4.066E+02 | −3.491E+02 |
| 26th Coefficient(N) | 1.425E−01 | 4.218E+00 | 5.106E+01 | −2.330E+03 | 5.316E+03 | −1.687E+02 | 1.493E+02 |
| 28th Coefficient(O) | −1.893E−02 | −6.660E−01 | −1.045E+01 | 6.389E+02 | −1.440E03+ | 4.157E+01 | −3.771E+01 |
| 30th Coefficient(P) | 1.145E−03 | 4.722E−02 | 9.642E−01 | −7.862E+01 | 1.752E+02 | −4.600E+00 | 4.257E+00 |

| | Surface No. | | | | | | |
|---|---|---|---|---|---|---|---|
| | S8 | S9 | S10 | S11 | S12 | S13 | S14 |
| Conic Coefficient (K) | 99.000 | −31.927 | 1.053 | 5.340 | −6.014 | −3.760 | −5.183 |
| 4th Coefficient(A) | −1.027E−01 | −2.077E−01 | −2.515E−01 | −2.315E−03 | 4.891E−02 | −1.834E−01 | −1.106E−01 |
| 6th Coefficient(B) | −1.074E−02 | 2.494E−01 | 1.801E−01 | −6.672E−02 | 1.227E−02 | 7.836E−02 | 6.321E−02 |
| 8th Coefficient(C) | 5.665E−01 | −5.808E−01 | −1.830E−01 | 1.335E−01 | −9.347E−02 | −1.173E−02 | −2.630E−02 |
| 10th Coefficient(D) | −2.644E+00 | 2.089E+00 | 4.466E−01 | −1.899E−01 | 2.018E−01 | −3.847E−03 | 8.151E−03 |
| 12th Coefficient(E) | 6.634E+00 | −5.805E+00 | −1.105E+00 | 2.087E−01 | −2.445E−01 | 2.690E−03 | −1.895E−03 |
| 14th Coefficient(F) | −1.057E+01 | 1.090E+01 | 1.812E+00 | −1.870E−01 | 1.816E−01 | −7.743E−04 | 3.304E−04 |
| 16th Coefficient(G) | 1.061E+01 | −1.423E+01 | −2.017E+00 | 1.260E−01 | −8.913E−02 | 1.394E−04 | −4.340E−05 |
| 18th Coefficient(H) | −5.418E+00 | 1.322E+01 | 1.584E+00 | −6.046E−02 | 3.022E−02 | −1.719E−05 | 4.308E−06 |
| 20th Coefficient(J) | −1.208E+00 | −8.814E+00 | −8.908E−01 | 2.023E−02 | −7.211E−03 | 1.498E−06 | −3.215E−07 |
| 22nd Coefficient(L) | 4.386E+00 | 4.172E+00 | 3.564E−01 | −4.662E−03 | 1.212E−03 | −9.251E−08 | 1.775E−08 |
| 24th Coefficient(M) | −3.545E+00 | −1.365E+00 | −9.872E−02 | 7.237E−04 | −1.405E−04 | 3.969E−09 | −7.012E−10 |
| 26th Coefficient(N) | 1.529E+00 | 2.919E−01 | 1.793E−02 | −7.224E−05 | 1.070E−05 | −1.127E−10 | 1.869E−11 |
| 28th Coefficient(O) | −3.588E−01 | −3.657E−02 | −1.915E−03 | 4.187E−06 | −4.823E−07 | 1.907E−12 | −2.999E−13 |
| 30th Coefficient(P) | 3.618E−02 | 2.023E−03 | 9.098E−05 | −1.072E−07 | 9.745E−09 | −1.457E−14 | 2.181E−15 |

Figure 16:
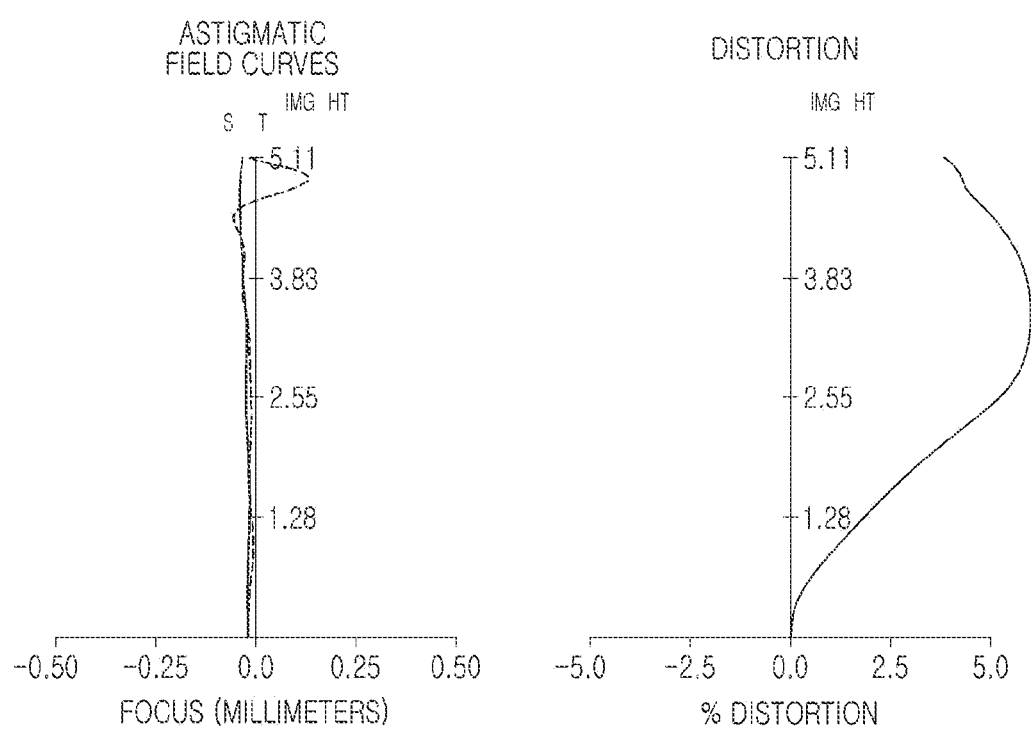
FIG. 16 is a diagram illustrating aberration properties of the example optical imaging system illustrated in FIG. 15.

The above-configured example optical imaging system may have aberration properties illustrated in FIG. 16.

Figure 17:
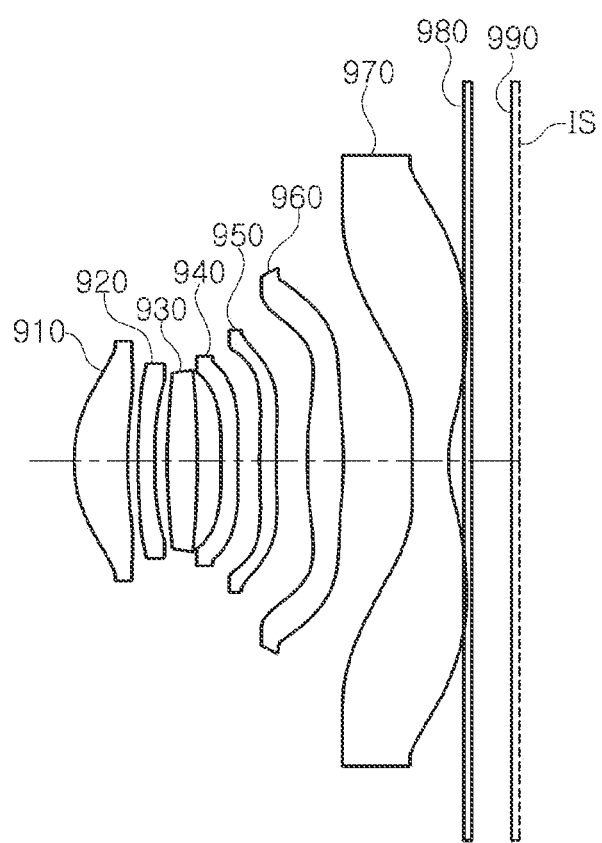
FIG. 17 is a diagram illustrating an example optical imaging system according to a ninth example embodiment.

An example optical imaging system according to a ninth example embodiment will be described with reference to FIGS. 17 and 18.

An example optical imaging system 900 in the ninth example embodiment may include an optical system including a first lens 910, a second lens 920, a third lens 930, a fourth lens 940, a fifth lens 950, a sixth lens 960, and a seventh lens 970, and may further include a filter 980 and an image sensor IS.

The example optical imaging system in the ninth example embodiment may form a focus on an imaging plane 990. The imaging plane 990 may refer to a surface on which a focus is formed by an optical imaging system. In an example, the imaging plane 990 may refer to one surface of the image sensor IS on which light is received.

The lens properties (a radius of curvature, a thickness of the lens or a distance between the lenses, a refractive index, an Abbe number, and a focal length) of each lens are listed in Table 17 below.

the fifth lens 950 may be concave in the paraxial region and convex in a portion or region other than the paraxial region.

The sixth lens 960 may have positive refractive power, and the first surface of the sixth lens 960 may be convex in the paraxial region, and the second surface of the sixth lens 960 may be convex in the paraxial region.

TABLE 17

| Surface No. | Note | Radius of Curvature | Thickness or Distance | Refractive Index | Abbe Number | Focal Length |
|---|---|---|---|---|---|---|
| S1 | First Lens | 2.0948 | 0.7386 | 1.544 | 56.0 | 5.47 |
| S2 | | 6.1218 | 0.1379 | | | |
| S3 | Second Lens | 9.0500 | 0.2200 | 1.680 | 18.2 | −17.77 |
| S4 | | 5.1527 | 0.1779 | | | |
| S5 | Third Lens | 10.9487 | 0.4055 | 1.535 | 55.7 | 14.64 |
| S6 | | −27.5703 | 0.3287 | | | |
| S7 | Fourth Lens | −10.8002 | 0.2249 | 1.680 | 18.2 | −20.79 |
| S8 | | −44.2184 | 0.2952 | | | |
| S9 | Fifth Lens | 5.6070 | 0.2251 | 1.635 | 24.0 | −67.23 |
| S10 | | 4.8838 | 0.4209 | | | |
| S11 | Sixth Lens | 6.5894 | 0.4859 | 1.567 | 37.4 | 5.62 |
| S12 | | −6.0810 | 0.9447 | | | |
| S13 | Seventh Lens | 20.3643 | 0.4979 | 1.535 | 55.7 | −3.82 |
| S14 | | 1.8491 | 0.2000 | | | |
| S15 | Filter | Infinity | 0.1100 | 1.517 | 64.2 | |
| S16 | | Infinity | 0.5368 | | | |
| S17 | Imaging Plane | Infinity | | | | |

In the example optical imaging system according to the ninth embodiment, a total focal length f may be 4.96 mm, IMG HT may be 5.107 mm, FOV may be 88.9°, SAG42 may be −0.3534 mm, and SAG52 may be −0.4707 mm, SAG62 may be −0.8829 mm, and SAG72 may be −0.5357 mm.

In the ninth example embodiment, the first lens 910 may have positive refractive power, the first surface of the first lens 910 may be convex, and the second surface of the first lens 910 may be concave.

The second lens 920 may have negative refractive power, the first surface of the second lens 920 may be convex, and the second surface of the second lens 920 may be concave.

The third lens 930 may have positive refractive power, and the first surface of the third lens 930 may be convex and the second surface of the third lens 930 may be convex.

The fourth lens 940 may have negative refractive power, the first surface of the fourth lens 940 may be concave, and the second surface of the fourth lens 940 may be convex.

The fifth lens 950 may have negative refractive power, the first surface of the fifth lens 950 may be convex in the paraxial region, and the second surface of the fifth lens 950 may be concave in a paraxial region.

At least one inflection point may be formed on at least one of the first surface and the second surface of the fifth lens 950. In an example, the first surface of the fifth lens 950 may be convex in the paraxial region and concave in a portion or region other than the paraxial region. The second surface of At least one inflection point may be formed on at least one of the first surface and the second surface of the sixth lens 960. In an example, the first surface of the sixth lens 960 may be convex in the paraxial region and concave in a portion or region other than the paraxial region. The second surface of the sixth lens 960 may be convex in the paraxial region and concave in a portion or region other than the paraxial region.

The seventh lens 970 may have negative refractive power, the first surface of the seventh lens 970 may be convex in the paraxial region, and the second surface of the seventh lens 970 may be concave in the paraxial region.

At least one inflection point may be formed on at least one of the first surface and the second surface of the seventh lens 970. In an example, the first surface of the seventh lens 970 may be convex in the paraxial region and concave in a portion or region other than the paraxial region. The second surface of the seventh lens 970 may be concave in the paraxial region and convex in a portion or region other than the paraxial region.

Each surface of the first lens 910 to the seventh lens 970 may have an aspherical coefficient, as illustrated in Table 18 below. In an example, both the object-side surfaces and the image-side surfaces of the first lens 910 to the seventh lens 970 may be aspherical.

TABLE 18

| | Surface No. | | | | | | |
|---|---|---|---|---|---|---|---|
| | S1 | S2 | S3 | S4 | S5 | S6 | S7 |
| Conic Coefficient (K) | −1.934 | −34.937 | 19.567 | 12.715 | 4.137 | −37.607 | 42.246 |
| 4th Coefficient(A) | 2.601E−02 | −2.772E−02 | −5.730E−02 | 1.715E−02 | −7.321E−03 | −1.770E−02 | −5.964E−02 |
| 6th Coefficient(B) | −3.593E−02 | 2.064E−01 | 3.115E−01 | −6.538E−01 | 1.378E−02 | −7.014E−03 | −2.099E−01 |
| 8th Coefficient(C) | 2.022E−01 | −1.145E+00 | −1.910E+00 | 6.428E+00 | −1.019E+00 | 1.219E−01 | 1.975E+00 |
| 10th Coefficient(D) | −7.492E−01 | 3.930E+00 | 8.103E+00 | −4.065E+01 | 1.245E+01 | −7.893E−01 | −1.108E+01 |
| 12th Coefficient(E) | 1.839E+00 | −9.120E+00 | −2.330E+01 | 1.789E+02 | −7.872E+01 | 2.468E+00 | 4.057E+01 |
| 14th Coefficient(F) | −3.123E+00 | 1.494E+01 | 4.724E+01 | −5.610E+02 | 3.096E+02 | −3.837E+00 | −1.031E+02 |
| 16th Coefficient(G) | 3.755E+00 | −1.772E+01 | −6.936E+01 | 1.268E+03 | −8.150E+02 | 1.089E+00 | 1.871E+02 |
| 18th Coefficient(H) | −3.234E+00 | 1.538E+01 | 7.485E+01 | −2.078E+03 | 1.488E+03 | 7.360E+00 | −2.452E+02 |
| 20th Coefficient(J) | 1.999E+00 | −9.773E+00 | −5.955E+01 | 2.463E+03 | −1.910E+03 | −1.594E+01 | 2.325E+02 |
| 22nd Coefficient(L) | −8.778E−01 | 4.488E+00 | 3.461E+01 | −2.087E+03 | 1.720E+03 | 1.725E+01 | −1.579E+02 |
| 24th Coefficient(M) | 2.670E−01 | −1.448E+00 | −1.431E+01 | 1.231E+03 | −1.064E+03 | −1.139E+01 | 7.485E+01 |
| 26th Coefficient(N) | −5.344E−02 | 3.110E−01 | 3.993E+00 | −4.798E+02 | 4.307E+02 | 4.654E+00 | −2.350E+01 |
| 28th Coefficient(O) | 6.323E−03 | −3.987E−02 | −6.741E−01 | 1.110E+02 | −1.027E+02 | −1.089E+00 | 4.393E+00 |
| 30th Coefficient(P) | −3.349E−04 | 2.306E−03 | 5.203E−02 | −1.153E+01 | 1.094E+01 | 1.121E−01 | −3.699E−01 |

| | Surface No. | | | | | | |
|---|---|---|---|---|---|---|---|
| | S8 | S9 | S10 | S11 | S12 | S13 | S14 |
| Conic Coefficient (K) | 99.000 | −30.875 | 1.160 | 5.266 | −1.887 | −4.575 | −5.852 |
| 4th Coefficient(A) | −8.092E−02 | −1.763E−01 | −2.051E−01 | −1.356E−03 | 4.376E−02 | −1.517E−01 | −8.552E−02 |
| 6th Coefficient(B) | −2.338E−02 | 2.437E−01 | 1.947E−01 | −8.738E−03 | −1.005E−04 | 8.400E−02 | 5.171E−02 |
| 8th Coefficient(C) | 5.917E−01 | −6.341E−01 | −3.932E−01 | −1.684E−02 | −1.542E−02 | −4.066E−02 | −2.412E−02 |
| 10th Coefficient(D) | −3.023E+00 | 1.814E+00 | 8.858E−01 | 2.996E−02 | 9.693E−03 | 1.630E−02 | 8.174E−03 |
| 12th Coefficient(E) | 9.029E+00 | −3.939E+00 | −1.536E+00 | −3.248E−02 | −4.219E−03 | −4.775E−03 | −1.985E−03 |
| 14th Coefficient(F) | −1.825E+01 | 6.077E+00 | 1.915E+00 | 2.522E−02 | 2.143E−03 | 9.968E−04 | 3.477E−04 |
| 16th Coefficient(G) | 2.608E+01 | −6.695E+00 | −1.716E+00 | −1.434E−02 | −1.246E−03 | −1.497E−04 | −4.440E−05 |
| 18th Coefficient(H) | 2.680E+01 | 5.306E+00 | 1.108E+00 | 5.927E−03 | 5.623E−04 | 1.634E−05 | 4.160E−06 |
| 20th Coefficient(J) | 1.984E+01 | −3.022E+00 | −5.144E−01 | −1.767E−03 | −1.717E−04 | −1.300E−06 | −2.859E−07 |
| 22nd Coefficient(L) | −1.047E+01 | 1.223E+00 | 1.696E−01 | 3.758E−04 | 3.490E−05 | 7.466E−08 | 1.424E−08 |
| 24th Coefficient(M) | 3.827E+00 | −3.425E−01 | −3.862E−02 | −5.549E−05 | −4.671E−06 | −3.018E−09 | −5.002E−10 |
| 26th Coefficient(N) | −9.184E−01 | 6.286E−02 | 5.768E−03 | 5.385E−06 | 3.961E−07 | 8.148E−11 | 1.175E−11 |
| 28th Coefficient(O) | 1.296E−01 | −6.785E−03 | −5.073E−04 | −3.075E−07 | −1.930E−08 | −1.319E−12 | −1.657E−13 |
| 30th Coefficient(P) | −8.101E−03 | 3.253E−04 | 1.989E−05 | 7.802E−09 | 4.117E−10 | 9.681E−15 | 1.059E−15 |

Figure 18:
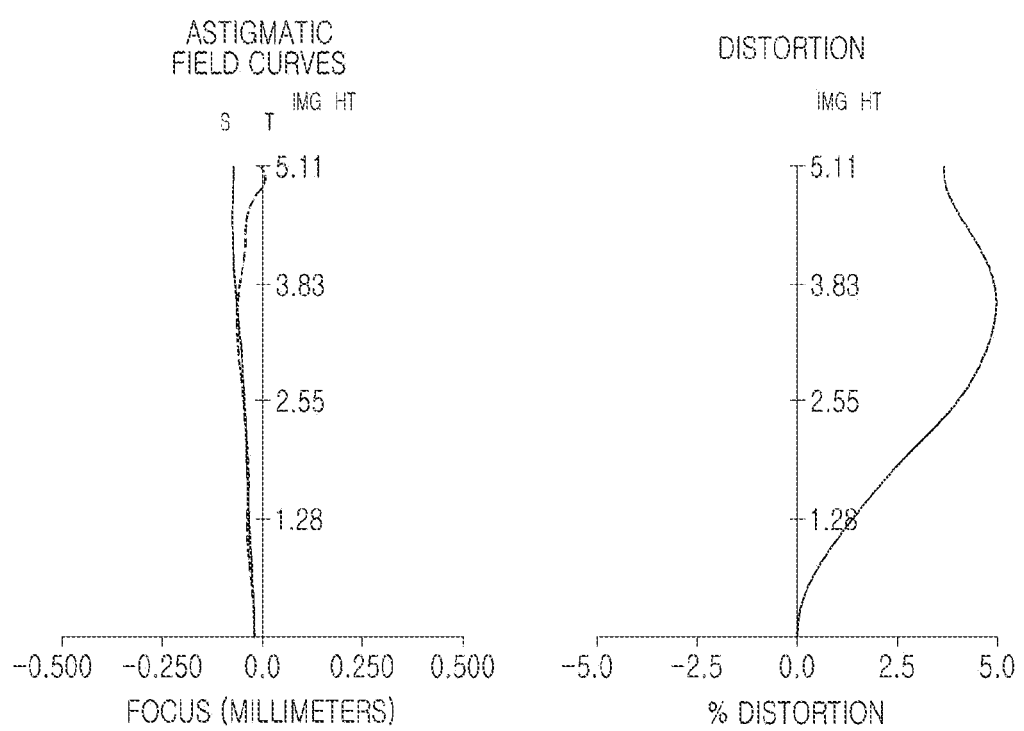
FIG. 18 is a diagram illustrating aberration properties of the example optical imaging system illustrated in FIG. 17.

The above-configured example optical imaging system may have aberration properties illustrated in FIG. 18.

Figure 19:
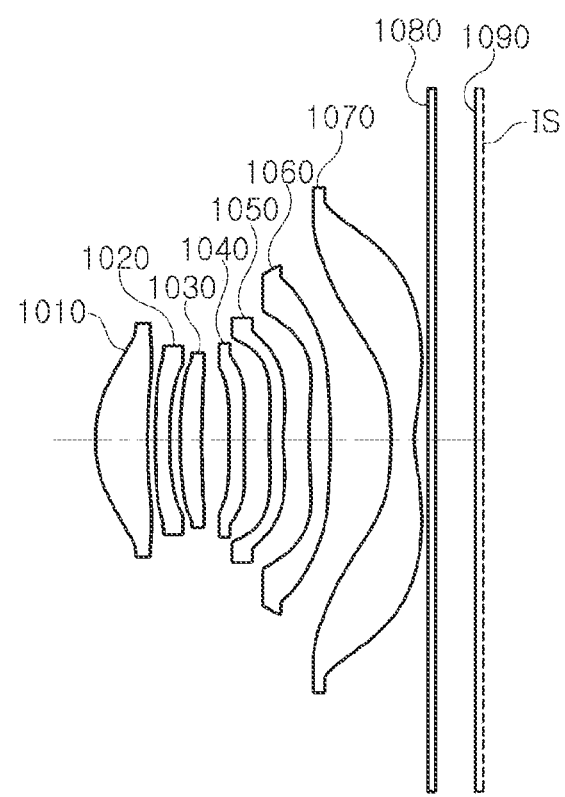
FIG. 19 is a diagram illustrating an example optical imaging system according to a tenth example embodiment.

An example optical imaging system 1010 according to a tenth example embodiment will be described with reference to FIGS. 19 and 20.

An example optical imaging system 1010 in the tenth example embodiment may include an optical system including a first lens 1010, a second lens 1020, a third lens 1030, a fourth lens 1040, a fifth lens 1050, a sixth lens 1060, and a seventh lens 1070, and may further include a filter 1080 and an image sensor IS.

The example optical imaging system in the ninth example embodiment may form a focus on an imaging plane 1090. The imaging plane 1090 may refer to a surface on which a focus is formed by an optical imaging system. In an example, the imaging plane 1090 may refer to a surface of the image sensor IS on which light is received.

The lens properties (a radius of curvature, a thickness of the lens or a distance between the lenses, a refractive index, an Abbe number, and a focal length) of each lens are listed in Table 19 below.

TABLE 19

| Surface No. | Note | Radius of Curvature | Thickness or Distance | Refractive Index | Abbe Number | Focal Length |
|---|---|---|---|---|---|---|
| S1 | First Lens | 2.0223 | 0.7892 | 1.544 | 56.0 | 4.95 |
| S2 |  | 6.9084 | 0.1223 |  |  |  |
| S3 | Second Lens | 10.4059 | 0.2200 | 1.680 | 18.2 | −11.91 |
| S4 |  | 4.5486 | 0.1554 |  |  |  |
| S5 | Third Lens | 5.6741 | 0.3336 | 1.535 | 55.7 | 15.66 |
| S6 |  | 17.0822 | 0.4030 |  |  |  |
| S7 | Fourth Lens | −29.3892 | 0.2445 | 1.680 | 18.2 | −53.08 |
| S8 |  | −150.0354 | 0.3662 |  |  |  |
| S9 | Fifth Lens | 6.5361 | 0.2200 | 1.635 | 24.0 | −51.25 |
| S10 |  | 5.3800 | 0.3764 |  |  |  |
| S11 | Sixth Lens | 6.6808 | 0.3298 | 1.567 | 37.4 | 6.56 |
| S12 |  | −8.3587 | 0.9144 |  |  |  |
| S13 | Seventh Lens | 53.5712 | 0.3600 | 1.535 | 55.7 | −3.5 |
| S14 |  | 1.8127 | 0.2000 |  |  |  |
| S15 | Filter | Infinity | 0.1100 | 1.517 | 64.2 |  |
| S16 |  | Infinity | 0.6051 |  |  |  |
| S17 | Imaging Plane | Infinity |  |  |  |  |

In the example optical imaging system in the tenth example embodiment, a total focal length f may be 5.27 mm, IMG HT may be 5.107 mm, FOV may be 85°, SAG42 may be −0.3707 mm, SAG52 may be −0.5412 mm, SAG62 may be −0.8408 mm, and SAG72 may be −1.3676 mm.

In the tenth example embodiment, the first lens 1010 may have positive refractive power, the first surface of the first lens 1010 may be convex, and the second surface of the first lens 1010 may be concave.

The second lens 1020 may have negative refractive power, the first surface of the second lens 1020 may be convex, and the second surface of the second lens 1020 may be concave.

The third lens 1030 may have positive refractive power, the first surface of the third lens 1030 may be convex, and the second surface of the third lens 1030 may be concave.

The fourth lens 1040 may have negative refractive power, the first surface of the fourth lens 1040 may be concave, and the second surface of the fourth lens 1040 may be convex.

The fifth lens 1050 may have negative refractive power, the first surface of the fifth lens 1050 may be convex in the paraxial region, and the second surface of the fifth lens 1050 may be concave in a paraxial region.

At least one inflection point may be formed on at least one of the first and second surfaces of the fifth lens 1050. In an example, the first surface of the fifth lens 1050 may be convex in the paraxial region and concave in a portion or region other than the paraxial region. The second surface of the fifth lens 1050 may be concave in the paraxial region and convex in a portion or region other than the paraxial region.

The sixth lens 1060 may have positive refractive power, and the first surface of the sixth lens 1060 may be convex in the paraxial region and the second surface of the sixth lens 1060 may be convex in the paraxial region.

At least one inflection point may be formed on at least one of the first surface and the second surface of the sixth lens 1060. In an example, the first surface of the sixth lens 1060 may be convex in the paraxial region and concave in a portion or region other than the paraxial region. The second surface of the sixth lens 1060 may be convex in the paraxial region and concave in a portion or region other than the paraxial region.

The seventh lens 1070 may have negative refractive power, the first surface of the seventh lens 1070 may be convex in the paraxial region, and the second surface of the seventh lens 1070 may be concave in the paraxial region.

At least one inflection point may be formed on at least one of the first surface and the second surface of the seventh lens 1070. In an example, the first surface of the seventh lens 1070 may be convex in the paraxial region and concave in a portion or region other than the paraxial region. The second surface of the seventh lens 1070 may be concave in the paraxial region and convex in a portion or region other than the paraxial region.

Each surface of the first lens 1010 to the seventh lens 1070 may have an aspherical coefficient, as illustrated in Table 20 below. In an example, both the object-side surfaces and the image-side surfaces of the first lens 1010 to the seventh lens 1070 may be aspherical.

TABLE 20

| | Surface No. | | | | | | |
|---|---|---|---|---|---|---|---|
| | S1 | S2 | S3 | S4 | S5 | S6 | S7 |
| Conic Coefficient (K) | −1.777 | −37.605 | 34.794 | 12.329 | 6.910 | 95.604 | 38.103 |
| 4th Coefficient(A) | 2.657E−02 | −3.018E−02 | −4.212E−02 | −1.594E−02 | −2.271E−02 | −2.978E−02 | −7.446E−02 |
| 6th Coefficient(B) | −4.293E−02 | 1.573E−01 | 7.018E−02 | −4.203E−01 | −4.628E−02 | 1.118E−01 | 1.426E−01 |
| 8th Coefficient(C) | 2.234E−01 | −7.782E−01 | 1.924E−01 | 5.381E+00 | 1.856E−01 | −6.920E−01 | −1.639E+00 |
| 10th Coefficient(D) | −7.485E−01 | 2.539E+00 | −1.965E+00 | −3.735E+01 | 7.510E−01 | 2.884E+00 | 1.058E+01 |
| 12th Coefficient(E) | 1.657E+00 | −5.601E+00 | 8.151E+00 | 1.699E+02 | −8.927E+00 | −8.740E+00 | −4.372E+01 |
| 14th Coefficient(F) | −2.537E+00 | 8.637E+00 | −2.076E+01 | −5.316E+02 | 3.859E+01 | 2.023E+01 | 1.220E+02 |
| 16th Coefficient(G) | 2.750E+00 | −9.546E+00 | 3.532E+01 | 1.175E+03 | −9.978E+01 | −3.606E+01 | −2.389E+02 |
| 18th Coefficient(H) | −2.140E+00 | 7.657E+00 | −4.157E+01 | −1.859E+03 | 1.711E+02 | 4.895E+01 | 3.346E+02 |
| 20th Coefficient(J) | 1.197E+00 | −4.464E+00 | 3.432E+01 | 2.113E+03 | −2.015E+02 | −4.956E+01 | −3.376E+02 |
| 22nd Coefficient(L) | −4.764E−01 | 1.870E+00 | −1.980E+01 | −1.710E+03 | 1.639E+02 | 3.642E+01 | 2.436E+02 |
| 24th Coefficient(M) | 1.317E−01 | −5.481E−01 | 7.813E+00 | 9.610E+02 | −9.049E+01 | −1.870E+01 | −1.227E+02 |
| 26th Coefficient(N) | −2.399E−02 | 1.066E−01 | −2.007E+00 | −3.564E+02 | 3.239E+01 | 6.323E+00 | 4.102E+01 |
| 28th Coefficient(O) | 2.588E−03 | −1.235E−02 | 3.016E−01 | 7.838E+01 | −6.782E+00 | −1.258E+00 | −8.174E+00 |
| 30th Coefficient(P) | −1.252E−04 | 6.442E−04 | −2.009E−02 | −7.743E+00 | 6.305E−01 | 1.110E−01 | 7.352E−01 |

| | Surface No. | | | | | | |
|---|---|---|---|---|---|---|---|
| | S8 | S9 | S10 | S11 | S12 | S13 | S14 |
| Conic Coefficient (K) | −99.000 | −44.474 | 1.240 | 2.208 | 7.014 | 80.572 | −13.590 |
| 4th Coefficient(A) | −9.421E−02 | −1.718E−01 | −2.137E−01 | −3.315E−02 | 2.557E−02 | −3.117E−01 | −1.284E−01 |
| 6th Coefficient(B) | 2.740E−01 | 3.351E−01 | 2.490E−01 | −2.244E−02 | −1.868E−02 | 2.792E−01 | 9.165E−02 |
| 8th Coefficient(C) | −1.896E+00 | −1.286E+00 | −6.205E−01 | 5.887E−02 | 6.422E−02 | −1.756E−01 | −4.555E−02 |
| 10th Coefficient(D) | 8.673E+00 | 4.119E+00 | 1.493E+00 | −1.214E−01 | −1.407E−01 | 8.032E−02 | 1.626E−02 |
| 12th Coefficient(E) | −2.686E+01 | −9.336E+00 | −2.714E+00 | 1.135E−01 | 1.510E−01 | −2.678E−02 | −4.285E−03 |
| 14th Coefficient(F) | 5.786E+01 | 1.483E+01 | 3.561E+00 | −4.726E−02 | −9.934E−02 | 6.562E−03 | 8.430E−04 |
| 16th Coefficient(G) | −8.889E+01 | −1.673E+01 | −3.370E+00 | −3.470E−03 | 4.427E−02 | −1.190E−03 | −1.244E−04 |
| 18th Coefficient(H) | 9.885E+01 | 1.352E+01 | 2.303E+00 | 1.477E−02 | −1.397E−02 | 1.599E−04 | 1.374E−05 |
| 20th Coefficient(J) | −7.985E+01 | −7.797E+00 | −1.132E+00 | −8.368E−03 | 3.170E−03 | −1.586E−05 | −1.125E−06 |
| 22nd Coefficient(L) | 4.645E+01 | 3.167E+00 | 3.958E−01 | 2.587E−03 | −5.145E−04 | 1.143E−06 | 6.699E−08 |
| 24th Coefficient(M) | −1.897E+01 | −8.784E−01 | −9.568E−02 | −4.923E−04 | 5.829E−05 | −5.822E−08 | −2.809E−09 |
| 26th Coefficient(N) | 5.168E+00 | 1.568E−01 | 1.517E−02 | 5.743E−05 | −4.375E−06 | 1.983E−09 | 7.831E−11 |
| 28th Coefficient(O) | −8.433E−01 | −1.600E−02 | −1.418E−03 | −3.776E−06 | 1.953E−07 | −4.053E−11 | −1.298E−12 |
| 30th Coefficient(P) | 6.237E−02 | 6.933E−04 | 5.907E−05 | 1.073E−07 | −3.921E−09 | 3.755E−13 | 9.655E−15 |

Figure 20:
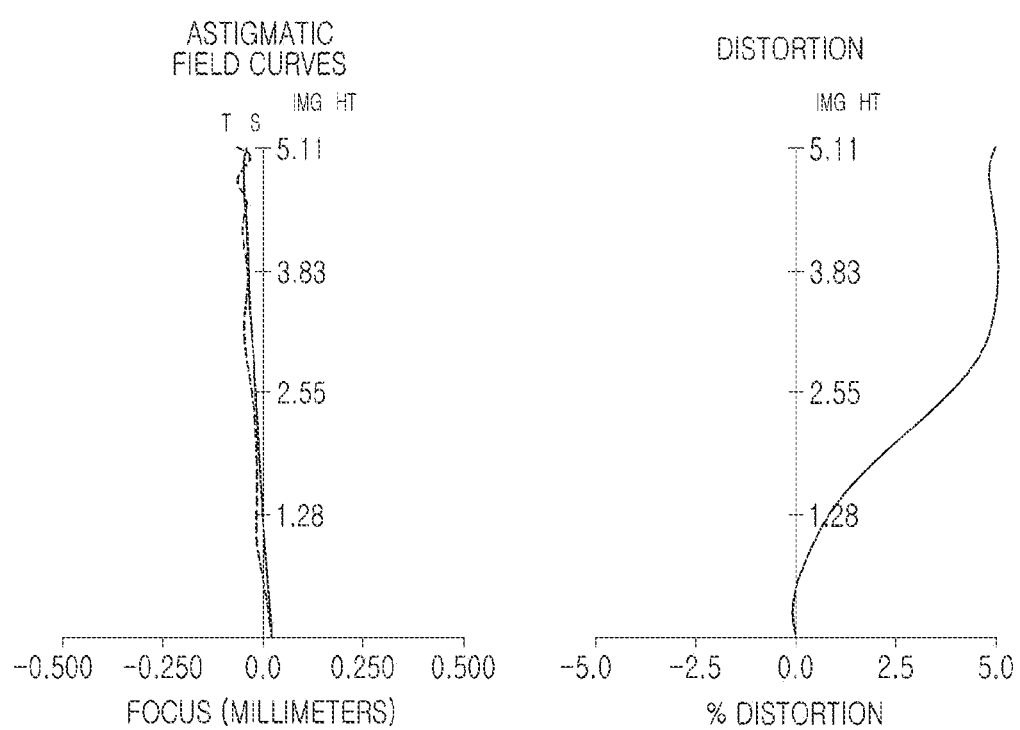
FIG. 20 is a diagram illustrating aberration properties of the example optical imaging system illustrated in FIG. 19.

The above-configured example optical imaging system may have aberration properties illustrated in FIG. 20.

As described above, an optical imaging system according to example embodiments of the present disclosure may have a reduced size while implementing high resolution.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
a first lens, a second lens, a third lens, a fourth lens, a fifth lens, a sixth lens, and a seventh lens disposed in order from an object side to an imaging side,
wherein the first lens has positive refractive power, and the second lens has negative refractive power, and
wherein $1<f3/f<6$ is satisfied,
where f is a total focal length of the optical imaging system, and f3 is a focal length of the third lens.

2. The optical imaging system of claim 1, wherein:
at least one of $-0.2<SAG52/TTL<0$, $-0.2<SAG62/TTL<0$; and $-0.3<SAG72/TTL<0$ is satisfied,
where SAG52 is a SAG value at an end of an effective aperture of an image-side surface of the fifth lens, SAG62 is a SAG value at an end of an effective aperture of an image-side surface of the sixth lens, and SAG72 is a SAG value at an end of an effective aperture of an image-side surface of the seventh lens.

3. The optical imaging system of claim 1, wherein:
at least one of $25<v1-v2<45$, $25<v1-v4<45$, and $15<v1-v6<25$ is satisfied, where v1 is an Abbe number of the first lens, v2 is an Abbe number of the second lens, v4 is an Abbe number of the fourth lens, and v6 is an Abbe number of the sixth lens.

4. The optical imaging system of claim 1, wherein:
$0<f1/f<1.4$ is satisfied,
where f is a total focal length of the optical imaging system, and f1 is a focal length of the first lens.

5. The optical imaging system of claim 1, wherein:
$-7<f2/f<-1$ is satisfied,
where f is a total focal length of the optical imaging system, and f2 is a focal length of the second lens.

6. The optical imaging system of claim 1, wherein:
$-50<f4/f<0$ is satisfied,
where f is a total focal length of the optical imaging system, and f4 is a focal length of the fourth lens.

7. The optical imaging system of claim 1, wherein:
$0<|f5/f|/100<3$ is satisfied,
where f is a total focal length of the optical imaging system, and f5 is a focal length of the fourth lens.

8. The optical imaging system of claim 1, wherein:
$0<f6/f<5$ is satisfied,
where f is a total focal length of the optical imaging system, and f6 is a focal length of the sixth lens.

9. The optical imaging system of claim 1, wherein:
$-3<f7/f<0$ is satisfied,
where f is a total focal length of the optical imaging system, and f7 is a focal length of the seventh lens.

10. The optical imaging system of claim 1, wherein:
$TTL/f<1.3$ and $BFL/f<0.3$ are satisfied,
where f is a total focal length of the optical imaging system, and BFL is a distance from an image-side surface of the seventh lens to the imaging plane on the optical axis.

11. The optical imaging system of claim 1, wherein:
$D1/f<0.1$ is satisfied,
where D1 is a distance between an image-side surface of the first lens and an object-side surface of the second lens on the optical axis.

12. The optical imaging system of claim 1, wherein:
FOV x (IMG HT/f)>70° is satisfied,
where f is a total focal length of the optical imaging system, and FOV is a field of view of the optical imaging system.

13. The optical imaging system of claim 1, wherein:
$n2+n4+n5>4.8$ is satisfied,
where n2 is a refractive index of the second lens, n4 is a refractive index of the fourth lens, and n5 is a refractive index of the fifth lens.

14. The optical imaging system of claim 13, wherein:
the third lens has positive refractive power, the fourth lens has negative refractive power, the fifth lens has negative refractive power, the sixth lens has positive refractive power, and the seventh lens has negative refractive power.

15. The optical imaging system of claim 13, wherein:
the third lens has positive refractive power, the fourth lens has negative refractive power, the fifth lens has positive refractive power, the sixth lens has positive refractive power, and the seventh lens has negative refractive power.

16. An optical imaging system, comprising:
a first lens, a second lens, a third lens, a fourth lens, a fifth lens, a sixth lens, and a seventh lens disposed in order from an object side to an imaging side,
wherein at least one of $-0.1<SAG42/TTL<0$, $-0.2<SAG52/TTL<0$, $-0.2<SAG62/TTL<0$; and $-0.3<SAG72/TTL<0$ is satisfied, and
wherein $1<f3/f<6$ is satisfied,
where TTL is a distance from an object-side surface of the first lens to an imaging plane on an optical axis, SAG42 is a SAG value at an end of an effective aperture of an image-side surface of the fourth lens, SAG52 is a SAG value at an end of an effective aperture of an image-side surface of the fifth lens, SAG62 is a SAG value at an end of an effective aperture of an image-side surface of the sixth lens, SAG72 is a SAG value at an end of an effective aperture of an image-side surface of the seventh lens, f is a total focal length of the optical imaging system, and f3 is a focal length of the third lens.

17. The optical imaging system of claim 16, wherein at least one inflection point is disposed on at least one of the first surface and the second surface of each of the fifth lens, the sixth lens, and the seventh lens.

18. The optical imaging system of claim 16,
wherein $BFL/f<0.3$ is satisfied,
where f is a total focal length of the optical imaging system, and BFL is a distance from an image-side surface of the seventh lens to the imaging plane on the optical axis.

19. The optical imaging system of claim 1,
wherein $TTL/(2\times IMG\ HT)<0.6$ and $-0.1<SAG42/TTL<0$ are satisfied,
where TTL is a distance from an object-side surface of the first lens to an imaging plane on an optical axis, IMG HT is equal to half a diagonal length of the imaging plane, and SAG42 is a SAG value at an end of an effective aperture of an image-side surface of the fourth lens.

* * * * *